United States Patent
Karnam et al.

(10) Patent No.: US 8,375,038 B2
(45) Date of Patent: Feb. 12, 2013

(54) METHOD TO SEND A SHORT MESSAGE SERVICE (SMS) CAMPAIGN TO A RELATED OBJECT BY SELECTING THE BASE OBJECT

(76) Inventors: Sujai Holal Karnam, Karnataka (IN); Aneesh Bhatnagar, Karnataka (IN)

( * ) Notice: Subject to any disclaimer, the term of this patent is extended or adjusted under 35 U.S.C. 154(b) by 0 days.

(21) Appl. No.: 13/054,499

(22) PCT Filed: Jul. 16, 2009

(86) PCT No.: PCT/IB2009/053084
§ 371 (c)(1),
(2), (4) Date: Apr. 14, 2011

(87) PCT Pub. No.: WO2010/018473
PCT Pub. Date: Feb. 18, 2010

(65) Prior Publication Data
US 2011/0191380 A1 Aug. 4, 2011

(30) Foreign Application Priority Data
Jul. 17, 2008 (IN) .......................... 1724/CHE/2008

(51) Int. Cl.
*G06F 17/30* (2006.01)
(52) U.S. Cl. ......... 707/755; 707/756; 707/802; 707/803
(58) Field of Classification Search .................. 707/609, 707/755–756, 802–803
See application file for complete search history.

(56) References Cited

U.S. PATENT DOCUMENTS

| | | | |
|---|---|---|---|
| 2006/0154713 A1* | 7/2006 | Sunazuka et al. | 463/6 |
| 2009/0077113 A1* | 3/2009 | Fidaali et al. | 707/102 |
| 2009/0112924 A1* | 4/2009 | Harris et al. | 707/103 X |
| 2009/0249355 A1* | 10/2009 | Kaarela et al. | 719/313 |
| 2010/0023495 A1* | 1/2010 | Gupta et al. | 707/4 |
| 2010/0094803 A1* | 4/2010 | Yamakawa et al. | 707/609 |

* cited by examiner

*Primary Examiner* — Hanh Thai
(74) *Attorney, Agent, or Firm* — Steven M. Greenberg, Esq.; Carey Rodriguez Greenberg O'Keefe, LLP

(57) ABSTRACT

A method to transmit SMS messages to a Related Object by selecting the Base Object and transmit SMS messages to both, the Base Object as well as to the Related Object, simultaneously, in a CRM application is disclosed. The relationship between the Base Object and the Related Object may be any one of one-to-one, one-to-many, many-to-one or many-to-many that can be defined while deploying the CRM application. The process takes place in different levels wherein the system decides whether the SMS message should be sent to the Base Object or different Related Objects depending upon the Campaign Workflow and locates the mobile phone number of the entity and finally transmits the SMS message via SMS Service Provider chosen from the user Interface.

16 Claims, 16 Drawing Sheets

| 701 | 702 | 703 |
|---|---|---|
| Related Object Mobile no | Subject | SMS Message |
| 4087051100 | University invitation | Hi Object X, We invite you for the Campus tour this Friday - University of XYZ |
| 7891231101 | University invitation | Hi Object Y, We invite you for the Campus tour this Friday - University of XYZ |

FIG. 7

| No. of Interactions | | Contact priority | Normal |
|---|---|---|---|
| Name | | E-mail | |
| Block Contact e-mail: | No | Send Mailers | Yes |
| Phone1 | | Created | |

Properties · Categories · Interactions · Opportunities · History

| | |
|---|---|
| Time zone | |
| No. of Interactions | |
| Name | |
| E-mail | |
| Block Contact e-mails | No |
| Date of birth | |
| Send Mailers | Yes |
| Contact priority | Normal |
| Message type | Text & HTML Type |
| Actual value | |
| Language | |
| Language | English (United States) |
| Default e-mail character set | |
| Send SMS | No |
| Block incoming SMS | No |
| Full Name | |
|   First name | |
|   Middle name | |
|   Last name | |
|   Salutations | |
|   Floor | |

One-to-Many Relationship

Base Object ID: 801

*Table 1800:*

| Customer_ID | First_Name | Last_Name | ---- | Mobile_no |
|---|---|---|---|---|
| 80101 | A | D | -- | 9698989775 |
| 80102 | B | E | -- | 9998989876 |
| 80103 | C | F | -- | 9798989976 |

Related Object ID: 901

*Table 1810:*

| Customer_ID | First_Name | Last_Name | ---- | ---- | Mobile_no_01 | Mobile_no_02 | Rel-801-ID |
|---|---|---|---|---|---|---|---|
| 90101 | X | D | -- | -- | 4087051100 | 4087051120 | 80101 |
| 90102 | Y | E | -- | -- | 7891231101 | 7891231156 | 80101 |
| 90103 | Z | F | -- | -- | 5095551256 | 5095551289 | 80102 |

*Table 1820:*

| Property ID | Property display name | Table name | Column name | Related property ID |
|---|---|---|---|---|
| 001 | Customer_ID | Table 1800 | Customer_ID | NULL |
| 002 | First_Name | Table 1800 | First_Name | NULL |
| 003 | Last_Name | Table 1800 | Last_Name | NULL |
| 004 | Mobile_no | Table 1800 | Mobile_no | NULL |
| 005 | Customer_ID | Table 1810 | Customer_ID | NULL |
| 006 | First_Name | Table 1810 | First_Name | NULL |
| 007 | Last_Name | Table 1810 | Last_Name | NULL |
| 008 | Mobile_no_01 | Table 1810 | Mobile_no_01 | NULL |
| 009 | Mobile_no_02 | Table 1810 | Mobile_no_02 | NULL |
| 010 | Rel-801-ID | Table 1810 | Customer_ID | 005 |

FIG. 18

Many-to-One Relationship

Base Object ID: 801

1900

| Customer_ID | First_Name | Last_Name | ---- | Mobile_no | Rel-901-ID |
|---|---|---|---|---|---|
| 80101 | A | D | -- | 9698989775 | 90101 |
| 80102 | B | E | -- | 9998989876 | 90101 |
| 80103 | C | F | -- | 9798989976 | 90101 |

Related Object ID: 901

1910

| Customer_ID | First_Name | Last_Name | ---- | ---- | Mobile_no_01 | Mobile_no_02 |
|---|---|---|---|---|---|---|
| 90101 | X | D | -- | -- | 4087051100 | 4087051120 |
| 90102 | Y | E | -- | -- | 7891231101 | 7891231156 |
| 90103 | Z | F | -- | -- | 5095551256 | 5095551289 |

1904      1905      1920

| Property ID | Property display name | Table name | Column name | Related property ID |
|---|---|---|---|---|
| 001 | Customer_ID | Table 1900 | Customer_ID | NULL |
| 002 | First_Name | Table 1900 | First_Name | NULL |
| 003 | Last_Name | Table 1900 | Last_Name | NULL |
| 004 | Mobile_no | Table 1900 | Mobile_no | NULL |
| 005 | Customer_ID | Table 1910 | Customer_ID | NULL |
| 006 | First_Name | Table 1910 | First_Name | NULL |
| 007 | Last_Name | Table 1910 | Last_Name | NULL |
| 008 | Mobile_no_01 | Table 1910 | Mobile_no_01 | NULL |
| 009 | Mobile_no_02 | Table 1910 | Mobile_no_02 | NULL |
| 010 | Rel-901-ID | Table 1900 | Rel-901-ID | 005 |

FIG. 19

METHOD TO SEND A SHORT MESSAGE SERVICE (SMS) CAMPAIGN TO A RELATED OBJECT BY SELECTING THE BASE OBJECT

CROSS-REFERENCE TO RELATED APPLICATIONS

This application is a §371 national stage entry of International Application No. PCT/IB2009/053084, filed Jul. 16, 2009, which claims priority to Indian Patent Application No. 1724/CHE/2008, filed Jul. 17, 2008.

TECHNICAL FIELD

The present invention relates to a method to send SMS messages to a Related Object where the original or Base Object is a different entity in the contact database in a Customer Relationship Management (CRM) application.

BACKGROUND ART

SMS Campaigns through a CRM application play a vital role in acquiring customers, strengthen existing customers and prospect relationships and to provide better services to the customers. The messages are sent usually to manage communication plans and conduct automated closed-loop campaigns, newsletters and surveys that develop awareness, generate prospect leads and proactively communicate with prospects and constituents in a personalized one-to-one manner. Most of the CRM applications available today support the transmission of bulk SMS Text Messages constituting a Marketing Campaign. Bulk SMS marketing campaigns are becoming widely accepted as a new business communication vehicle. The direct and personal approach of SMS messaging to the individual leads to a higher average response rate and increased attention levels experienced by the recipient.

DISCLOSURE OF INVENTION

Technical Problem

SMS Campaign becomes difficult when the SMS messages have to be transmitted to the people who are related to the contacts that are originally the part of the Campaign in a CRM application. For example, SMS messages have to be occasionally sent to the parent (herein after referred to as Related Object) of a student while only the student (herein after referred to as Base Object) is a part of the campaign. This facility has never been met in any of the CRM applications so far. SMS Campaign in a CRM application requires the target/contact to be a part of the campaign. Consequently, if an institution/organization has to send an SMS message to a Related Object, for example, to the student's parent where the parent is a Related Object, the Related Object should be a part of the campaign. This is a limitation as the Related Object is treated as a different target/contact and all the activities are tracked for the Related Object and not the Base Object who is the actual target for the Campaign. For example, a case in which a prospective student is the main target for the SMS Campaign, all communications and responses have to be tracked based on the student's contact. Having a separate campaign or mailing list for the parents will be another problem since in that case, there would be two entirely different campaigns and sets of contacts and mapping reports based on the student would be a challenge. Since the Related Objects, for example parents, teachers or guidance counselors and other relations are actively involved and influence the decision making process of the student (Base Object), it is important to send the communication with them in parallel since this would result in increased conversion rate of the campaign and will be more cost effective. Hence, it is very critical to track all the interactions with the student and at the same time to track the success of campaigns.

Hence what is needed is a system and method that can transmit SMS message to the Related Object by selecting the Base Object in a CRM application and can transmit SMS messages to the Base Object as well as to the Related Object simultaneously.

Technical Solution

The invention meets the above needs and overcomes the deficiencies in the existing technologies by providing a method to send SMS messages to a Related Object by selecting the Base Object in a CRM application and send SMS messages to the Base Object as well as to the Related Object simultaneously. In particular, the present invention relates to a method to send SMS message during a Campaign, to a Related Object where the original or the Base Object is a different entity. SMS messages may be sent to the Base Object as well where it is not required to send SMS to the Related Object. The process takes place in different levels wherein the system decides whether the SMS message should be sent to the Base Object or different Related Objects depending upon the Campaign Workflow and locates the mobile phone number of the entity and finally transmits the SMS message.

Generally, a Campaign Workflow in a CRM application may consist of various components such as predefined Actions based on a particular event. Various Actions may be defined for each event, based on the response of customers. An event triggers the Action that follows it. The invention uses a method where the Base Object, called as target/contact, is a part of the campaign and the Campaign Workflow could be configured to send the SMS message to any of its Related Objects. The target flows through the various steps in the Campaign Workflow. When a target i.e. the Base Object reaches the steps which are configured to send SMS messages to one of its Related Objects, the invented method checks the database tables to locate the Related Object, goes to the Related Object's record and picks up the mobile number of the Related Object to transmit the SMS message. Various Related Objects that are usually the influencers or decision makers, could be involved at various levels in the Campaign process. The Base Object is the main target where it is not required to have Related Object in the Campaign. There may be different types of relationships among various Base Objects and Related Objects such as one-to-one, one-to-many, many-to-one or many-to-many. The Campaign Workflow is designed based on these relationships. In a one-to-one relationship each Base Object may have one and only one Related Object. In case of one-to-many relationship each Base Object may have two or more Related Objects. In case of many-to-one relationship, two or more Base Objects may have only one Related Object that is common between them. Similarly, in case of many-to-many relationship, two or more Base Objects may have two or more Related Objects.

According to one aspect of the invention, a method to send a SMS message to a Related Object by selecting the Base Object in case of one-to-one relationship in a CRM application includes creating a campaign workflow with send SMS Action; selecting mobile property of the Related Object from the User Interface of the CRM application while building the campaign workflow; building a set of code containing information about the mobile property of the Related Object in a pre-defined format; saving the campaign workflow in the application database wherein the application database is a centralized customer repository configured to store data; updating the database table. According to a further embodiment of the invention, the method further includes running the campaign workflow with the targets of the campaign; parsing the set of code and extracting mobile property ID, Base Object ID, Related Object ID and the Related Object mapped property ID; based on Related Object Mapped Property ID, searching for the mobile property of the Related Object from the records of the Related Object table; forming a query to fetch mobile property values from the records of the database table; updating staging table with fetched mobile property values; placing respective SMS message to the outbound message queue against fetched mobile number in the staging table; and transmitting SMS message to the respective SMS Service Provider whereby the SMS service provider further transmits the SMS message to the Related Object.

According to another aspect of the invention, a method to send a SMS message to a Related Object by selecting the Base Object in case of one-to-many relationship in a CRM application includes creating a campaign workflow with send SMS Action; selecting mobile property of the Related Object from the User Interface of the CRM application while building the campaign workflow; building a set of code containing information about the mobile property of the Related Object in a pre-defined format; saving the campaign workflow in the application database wherein the application database is a centralized customer repository configured to store data; updating the database table. According to a further embodiment of the invention, the method further includes running the campaign workflow with the targets of the campaign; parsing the set of code and extracting mobile property ID, Base Object ID, Related Object ID and the Related Object Mapped Property ID; based on Related Object Mapped Property ID, searching for the mobile property of the Related Object from the records of the Related Object table; forming a query to fetch mobile property values from the records of the database table; updating staging table with fetched mobile property values; placing respective SMS message to the outbound message queue against fetched mobile number in the staging table; and transmitting SMS message to the respective SMS Service Provider whereby the SMS service provider further transmits the SMS message to the Related Object.

According to yet another aspect of the invention, a method to send a SMS message to a Related Object by selecting the Base Object in case of many-to-one relationship in a CRM application includes creating a campaign workflow with send SMS Action; selecting mobile property of the Related Object from the User Interface of the CRM application while building the campaign workflow; building a set of code containing information about the mobile property of the Related Object in a pre-defined format; saving the campaign workflow in the application database wherein the application database is a centralized customer repository configured to store data; updating the database table. According to a further embodiment of the invention, the method further includes running the campaign with the targets of the campaign; parsing the set of code and extracting mobile property ID, Base Object ID, Related Object ID and the Related Object Mapped Property ID; based on Related Object Mapped Property ID, searching for the mobile property of the Related Object from the records of the Related Object table; forming a query to fetch mobile property values from the records of the database table; updating staging table with fetched mobile property values; placing respective SMS message to the outbound message queue against fetched mobile number in the staging table; and transmitting SMS message to the respective SMS Service Provider whereby the SMS service provider further transmits the SMS message to the Related Object.

According to yet another aspect of the invention, a method to send a SMS message to a Related Object by selecting the Base Object in case of many-to-many relationship in a CRM application includes creating a campaign workflow with send SMS Action; selecting mobile property of the Related Object from the User Interface of the CRM application while building the campaign workflow; building a set of code containing information about the mobile property of the Related Object in a pre-defined format; saving the campaign workflow in the application database wherein the application database is a centralized customer repository configured to store data; updating the database table. According to a further embodiment of the invention, the method further includes running the campaign with the targets of the campaign; parsing the set of code and extracting mobile property ID, Base Object ID, Related Object ID and the Related Object Mapped Property ID; based on Related Object Mapped Property ID, searching for the mobile property of the Related Object from the records of the Related Object table; forming a query to fetch mobile property values from the records of the database table; updating staging table with fetched mobile property values; placing respective SMS message to the outbound message queue against fetched mobile number in the staging table; and transmitting SMS message to the respective SMS Service Provider whereby the SMS service provider further transmits the SMS message to the Related Object.

According to yet another aspect of the invention, a method to send SMS message to both the Base Object as well as to the Related Object includes creating campaign workflow with Action to send SMS to the Base Object and Action to send SMS to the Related Object; selecting mobile property of the Base Object from the CRM application User Interface while building the Action to send SMS to Base Object; selecting mobile property of the Related Object from the CRM application User Interface, while building the Action to send SMS to Related Object; building first set of code containing information about the mobile property of the Base Object in first pre-defined format wherein the mobile property is the mobile phone number selected from a list from the User Interface of the CRM application; building second set of code containing information about the mobile property of the Related Object in second predefined format wherein the mobile property is the mobile phone number selected from a list from the User Interface of the CRM application; saving the campaign workflow in the application database wherein the application database is a centralized customer repository configured to store data related to Base Objects and Related Objects; updating the database table containing outbound SMS messages; running the campaign with the targets of the campaign wherein the targets are the Base Objects in the campaign workflow; parsing first set of code into first string and extracting mobile property ID, Base Object ID, and name of the property from the first string; parsing second set of code into second string and extracting mobile property ID, Base Object ID, Related Object ID, the Related Object Mapped Property ID and name of the property from the second string; searching for the mobile property of the Base Object from the records of the Base Object table; based on Related Object Mapped Property ID, searching for the mobile property of the Related Object from the records of the Related Object table; forming a query to fetch mobile property values of Base Object and Related Object from the records of the database table; updating staging table with fetched mobile property values; placing respective SMS message to the outbound message queue against fetched mobile number in the staging table; and transmitting SMS message to the respective SMS Service Provider whereby the SMS service provider further transmits the SMS message to the mobile devices of the Base Object and the Related Object.

Advantageous Effects

The invention is the Unique Selling Proposition (USP) of the Campaign module in CRM application. It helps in marketing and selling the product globally as it is a generic solution applicable to different verticals and geographical markets. The invention also makes a great value add to an institution/organization as they can increase the conversion ratio of their Campaign and in turn have a better Return on Investment (ROI) for each Campaign.

The steps described in different aspects of the invention can be performed in different order. Furthermore, the steps may also be combined, for example two or more step may be performed together. The above, as well as the additional purposes, features and advantages of the present invention will become apparent in the following written description.

DESCRIPTION OF DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings. Example embodiments are illustrated by way of example and not limitation in the figures of the accompanying drawings, in which like references indicate similar elements and in which:

FIG. 7 displays an exemplary staging table where all the outgoing SMS messages may be queued up for transmission to the SMS service providers.

FIG. 8 is an exemplary screenshot of the User Interface through which a new contact may be created in a CRM application.

FIG. 9 is an exemplary screenshot of the User Interface displaying information about the Related Object.

FIG. 10 is an exemplary screenshot of the User Interface displaying a drop down menu of the relationships that may be created between a Base Object and a Related Object while deploying a CRM application on a computing device.

FIG. 18 illustrates a preferred structure of the database tables in case of one-to-many relationship, in accordance with one embodiment of the present.

FIG. 19 illustrates a preferred structure of the database tables in case of many-to-one relationship, in accordance with one embodiment of the present invention.

BEST MODE

Figure 1:
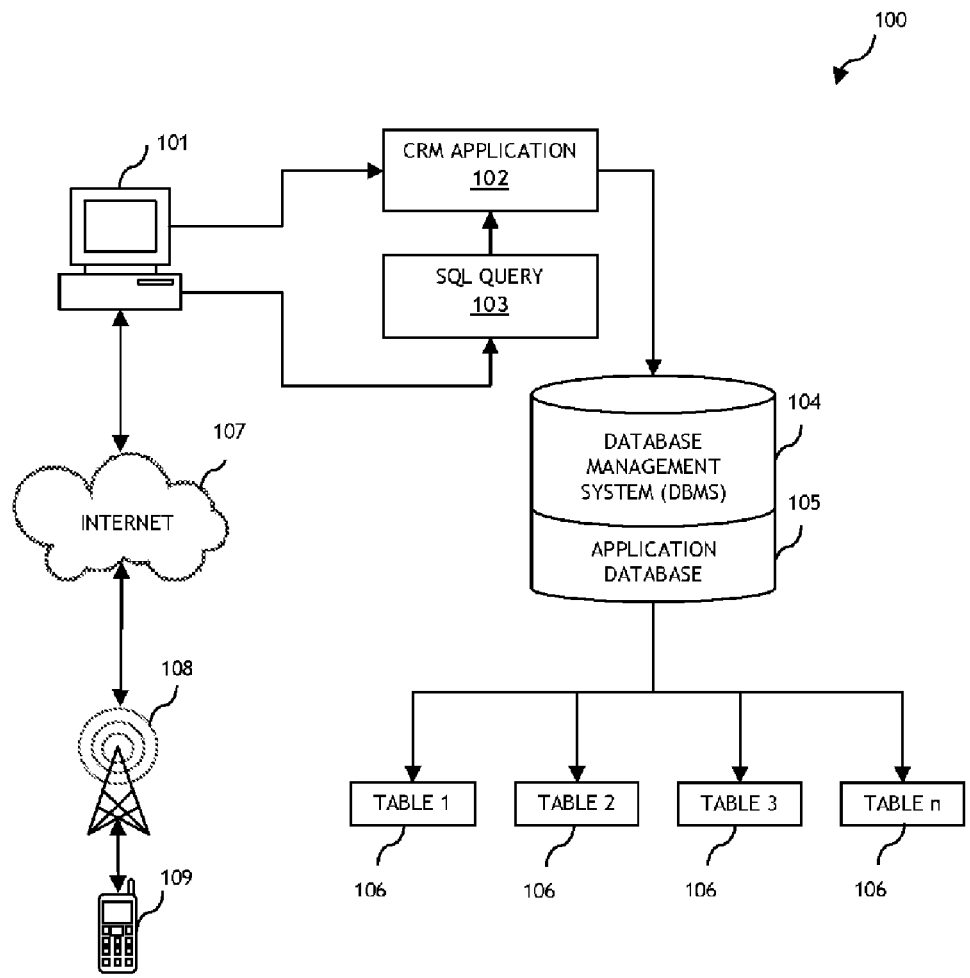
FIG. 1 illustrates a preferred system configuration for a CRM-DBMS (Database Management System) model using a CRM system and the Database Management System.

Embodiments of the present invention provide a method to send SMS messages to a Related Object by selecting the Base Object in a CRM application and send SMS messages to both, the Base Object as well as the Related Object simultaneously. Referring now to the drawings wherein the figures are made for the purpose of illustrating preferred embodiments of the present invention only and not for limiting the same.

In a database management system (DBMS), the data is stored in one or more data containers. Each container contains records and the data within each record is organized into one or more fields. In a relational database system, the data containers are referred to as tables, the records are referred to as rows, and the fields are referred to as columns. In object oriented databases, the data containers are referred to as object classes, the records are referred to as objects and the fields are referred to as attributes. Other database architectures may use different terminology. The claims of the present application are not limited to any particular type of data container or database architecture. Many applications having extensive data handling requirements often rely on an independent DBMS to help manage application data. Such applications may include business applications, including CRM systems and enterprise resource planning (ERP) systems.

FIG. 1 illustrates a preferred system configuration for a CRM-DBMS (Database Management System) system 100 using a CRM application 102 and the Database Management System (DBMS) 104. The CRM application 102 provides a means for accessing data to the CRM database through its User Interface. The DBMS 104 manages several databases containing sets of database tables 106. In the exemplary embodiment, database table 106 embodies the data of the contacts i.e. the base object and the related objects in separate tables. A contact is any individual or prospect who communicates the institution/organization via mobile device, telephone or email. Each contact record is assigned a unique record identifier called as Customer_ID in the exemplary embodiments. Various records in the tables may be linked together based on the Customer_ID that is constant between them. Application Database 105 contains information about the communication events exchanged between the CRM user and the contacts. The Campaign workflow is built in the CRM application 102 through its User Interface and is saved in the application database 105. The relationships between the Base Objects and the Related Objects in the database tables are defined while installing the CRM application 102 in the computing device 101. While creating the Campaign Workflow, with send SMS Action, the mobile property of the Related Object is selected from the User Interface of the CRM application 102 and unique set of code containing information about the mobile number of the target contact is built in a pre-defined format. The Campaign Workflow is saved in the Application Database 105. When the campaign is run with the targets of the campaign, the pre-defined format of the set of code is parsed and the suitable SQL queries built by the CRM application 102 using query command code are executed. The SQL query may access the DBMS 104 and retrieve a result set. This result set containing mobile numbers of the targets is used by the CRM application 102 to send SMS message to the Base Object or the Related Object (as the case may be) via internet 107. It is further transmitted to the configured mobile Service Provider 108 and finally received by the intended recipient using the mobile device 109.

Figure 2:
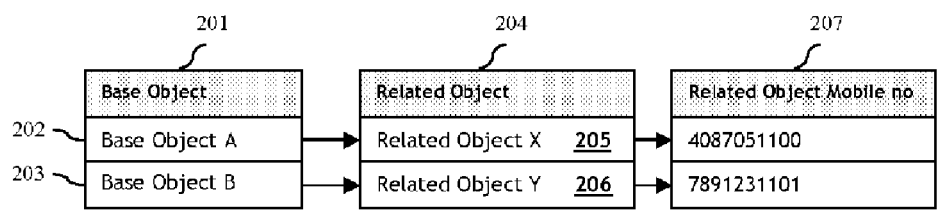
FIG. 2 is a graphical representation of one-to-one relationship between the Base Object and the Related Object according to one embodiment of the invention.

There may be various types of relationships that may be created between two contacts namely one-to-one, one-to-many, many-to-one or many-to-many. FIG. 2 is a graphical representation of one-to-one relationship between the Base Object and the Related Object according to one embodiment of the invention. In one-to-one relationship there may be only one Related Object with respect to the Base Object. For example only one parent, teacher or guidance counselor interested in receiving information related to a student. In this case the student may be termed as the Base Object whereas the parents, teachers or guidance counselors may be termed as Related Object. With respect to FIG. 2, each record in the Base Object table 201 relates to one and only one record in the Related Object table 204, and each record in the Related Object table 204 relates to one and only one record in the Base Object table 201. In other words, in a one-to-one relationship, each row in one database table is linked to only one row in another table. In the exemplary embodiment, in the Base Object table 201, there are two instances namely Base Object A 202 and Base Object B 203. Similarly, in the Related Object table 204, there are two instances namely Related Object X 205 and Related Object Y 206. The Base Object A 202 has only one Related Object i.e. Related Object X 205 and the Base Object B 203 also has only one Related Object i.e. Related Object Y 206. The Related Object X 205 has the mobile number 4087051100 whereas the Related Object Y 206 has the mobile number 7891231101 as shown in the table 207.

Figure 3:
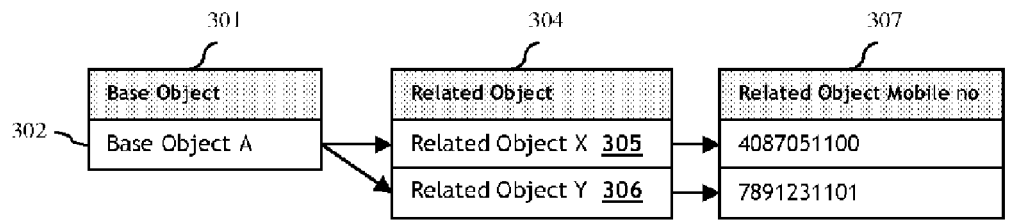
FIG. 3 is a graphical representation of one-to-many relationship between the Base Object and the Related Object according to one embodiment of the invention.

FIG. 3 is a graphical representation of one-to-many relationship between the Base Object and the Related Object according to one embodiment of the invention. In case of one-to-many relationship there may be more than one contact or person who may be interested in receiving messages with respect to the student's admission procedure, alerts or updates. For example the parents as well as teachers or guidance counselors may be interested in receiving information related to a student. In this case, the student may be termed as the Base Object whereas the parents, teachers or guidance counselors may be termed as the Related Object. With reference to databases, each row in the one table can be related to many rows in another table. As depicted in FIG. 3, a record in Base Object table 301 relates to two or more records in the Related Object table 304, similarly two or more records in Related Object table 304 can relate to only one record in Base Object table 301. In the exemplary Base Object table 301, there is one instance namely Base Object A 302. Similarly, in the exemplary Related Object table 304, there are two instances namely Related Object X 305 and Related Object Y 306. The Base Object A 302 has only two Related Objects i.e. Related Object X 305 and Related Object Y 306. The Related Object X 305 has the mobile number 4087051100 whereas the Related Object Y 306 has the mobile number 7891231101 as shown in table 307. There may be any number of Base Objects in the table 301 related to two or more records in the table 304.

Figure 4:
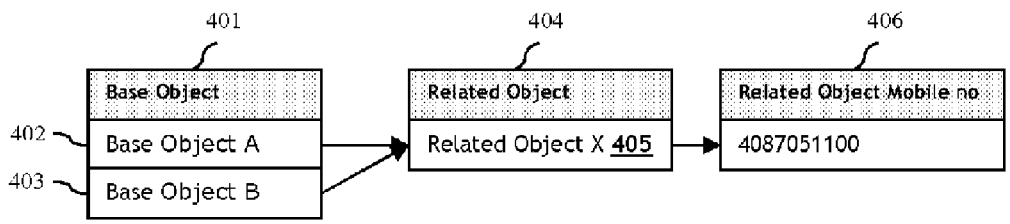
FIG. 4 is a graphical representation of many-to-one relationship between the Base Object and the Related Object according to one embodiment of the invention.

FIG. 4 is a graphical representation of many-to-one relationship between the Base Object and the Related Object according to one embodiment of the invention. In case of many-to-one relationship, there may be a number of contacts that have only one Related Object, for example a number of students may be related to one professor where the professor is interested in receiving information about his students. Here, the student may be termed as the Base Object whereas the professor may be termed as the Related Object. With reference to databases, two or more records in one table can relate to only one record in another table. As depicted in FIG. 4, two records in the Base Object table 401 relate to only one record in the Related Object table 404 similarly, one record in the Related Object table 404 may relate to two or more records in the Base Object table 401. In the exemplary embodiment, in the Base Object table 4 01, there are two instances namely Base Object A 402 and Base Object B 403. Similarly, in the Related Object table 404, there is only one instance namely Related Object X 405. The Base Object A 402 has only one Related Object i.e. Related Object X 405 and the Base Object B 403 also has the same Related Object i.e. Related Object X 405. The Related Object X 405 has the mobile number 4087051100 as shown in table 406. There may be any number of Base Objects in the table 401 related to one record in the table 404.

Figure 5:
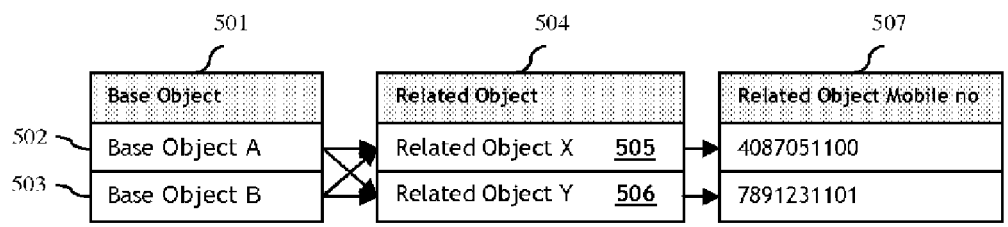
FIG. 5 is a graphical representation of many-to-many relationship between the Base Object and the Related Object according to one embodiment of the invention.

FIG. 5 is a graphical representation of many-to-many relationship between the Base Object and the Related Object according to one embodiment of the invention. In case of many-to-many relationship there may be two or more Base Objects who may have two or more Related Objects simultaneously. For example, a number of students in a class may be related to their parents, teachers or guidance counselors at the same time. Here a student may be termed as the Base Object whereas parents, teachers, or counselors may be termed as the Related Object. With reference to databases, two or more records in one table may relate to two or more records in the another table. As depicted in FIG. 5, two records in the Base Object table 501 relate to two records in the Related Object table 504 similarly, two or more records in the Related Object table 504 can relate to two or more records in Base Object table 501. In the exemplary embodiment, there are two instances namely Base Object A 502 and Base Object B 503, in the Base Object table 501. Similarly, in the Related Object table 504, there are two instances namely Related Object X 505 and Related Object Y 506. The Base Object A 502 has only two Related Objects, i.e. Related Object X 505 and Related Object Y 506 and similarly the Base Object B 503 also has only two Related Objects i.e. Related Object X 505 and Related Object Y 506. The Related Object X 505 has the mobile number 4087051100 whereas the Related Object Y 506 has the mobile number 7891231101 as shown in table 507. Thus, depending upon the relationship whenever an Object is read into the memory, the invented method automatically traverses through the field specifying the relationship and automatically read in the corresponding Related Object. Once the relationship is all defined from the User Interface (FIG. 10), the database tables are added or altered to store the reference of both types of Objects. These tables may be created or altered dynamically and may not have any fixed names but may have a unique table identifier in order to distinguish them from the rest of the tables and to facilitate the quick retrieval of information whenever required.

Figure 6:
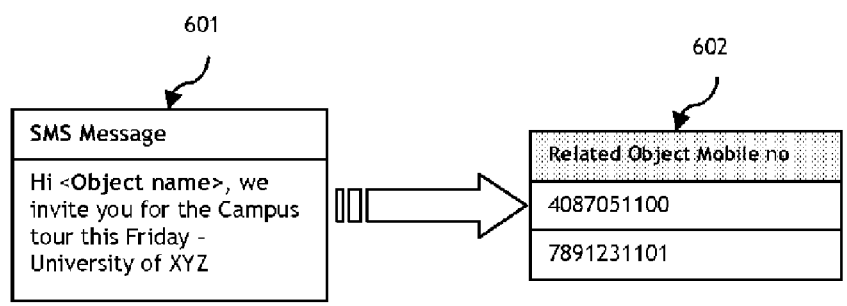
FIG. 6 displays the content of the SMS message intended to be transmitted among various Related Objects.

FIG. 6 displays the content of the SMS message intended to be transmitted among various Related Objects. Table 601 contains the exemplary SMS message to be transmitted to the mobile numbers of the Related Objects in table 602.

FIG. 7 displays an exemplary staging table where all the outgoing SMS messages may be queued up for transmission to the SMS service providers. After the mobile numbers are extracted from the Related Objects, the SMS message content is personalized by adding Related Object's name to the content. This SMS message 703 is queued up in the staging table along with the mobile number 701 and the subject line 702, for transmission to the corresponding Service Provider belonging to the Related Objects.

FIG. 8 is an exemplary screenshot of the User Interface through which a new contact may be created in a CRM application. The exemplary User Interface contains various fields under the properties tab that may include standard input fields such as First name, Middle name, Last name, Salutations, Date of birth, Address, Phone number, Mobile number Zip code etc. The information about any number of contacts may be added through the User Interface which is saved in the application database. The information is arranged in various tables with a unique record identifier assigned to each contact that facilitates in easy and fast retrieval of the information from the database whenever required.

Figures 9, 10:
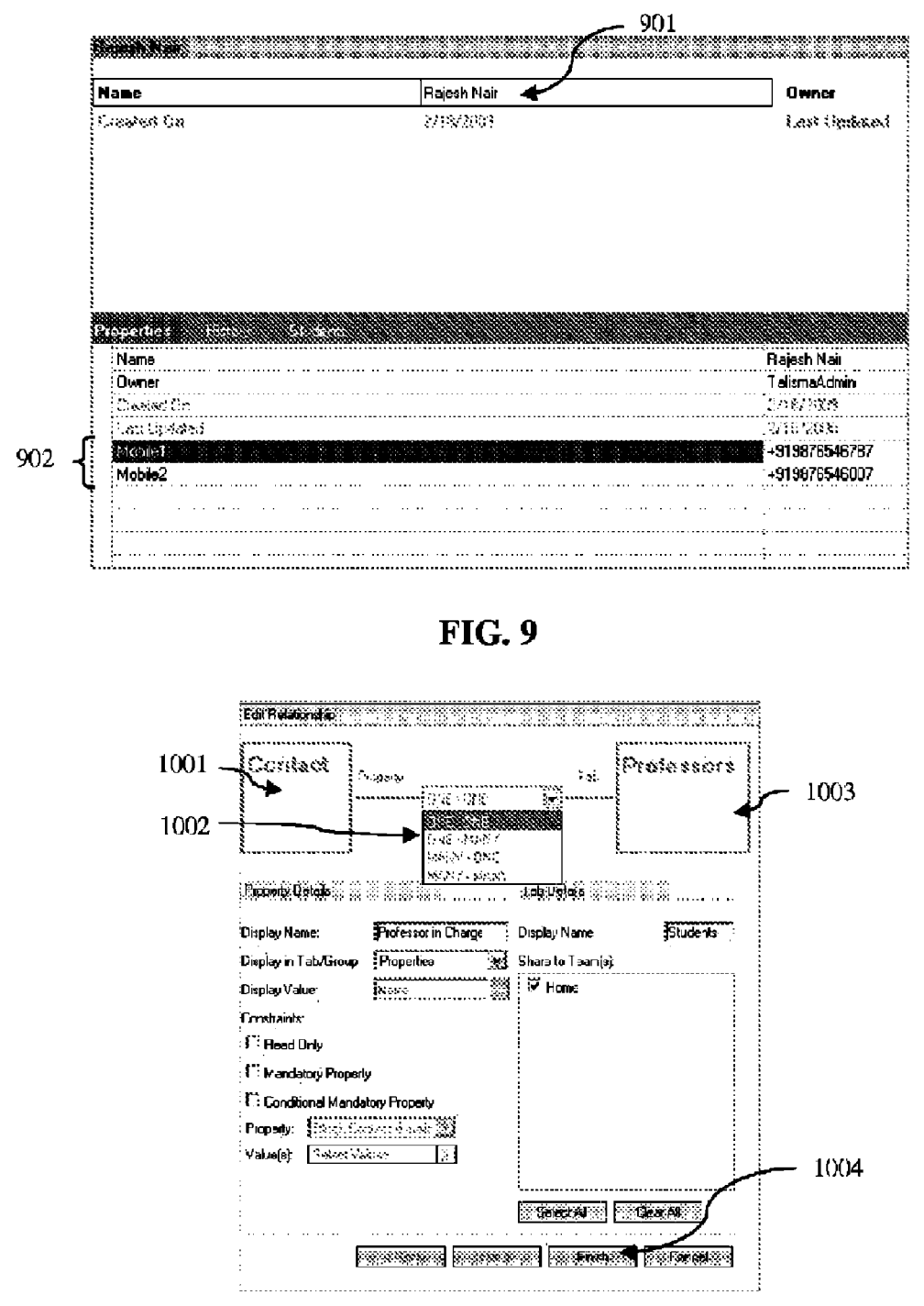

FIG. 9 is an exemplary screenshot of the User Interface displaying information about the Related Object 901. After the information is entered and saved in the application database, it may be retrieved and viewed by the CRM user. In the exemplary User Interface, the information about the contact 'Rajesh Nair' 901 is displayed in the User interface and other details such as Mobile number 902 are displayed under the 'Properties' tab. Additionally, the User Interface may also display information such as date of creation of the contact or the time the information was last updated in the application database.

FIG. 10 is an exemplary screenshot of the User Interface displaying a drop down menu of the relationships that may be created between a Base Object and a Related Object while deploying a CRM application on a computing device. In the exemplary embodiment of the user Interface, the contact 1001 that is the Base Object is shown on the left hand side of the User Interface. The contact 1001 may be a present student. On the right hand side the intended Related Object is shown who may be the Professor 1003 of the contact 1001. The drop down menu 1002 displays the relationships that may be created between them. In the exemplary embodiment a one-to-one relationship is created between the student and the professor wherein only one professor 1003 is related to the contact 1001. Similarly other types of relationship may also be created depending upon the requirement.

Figure 11:
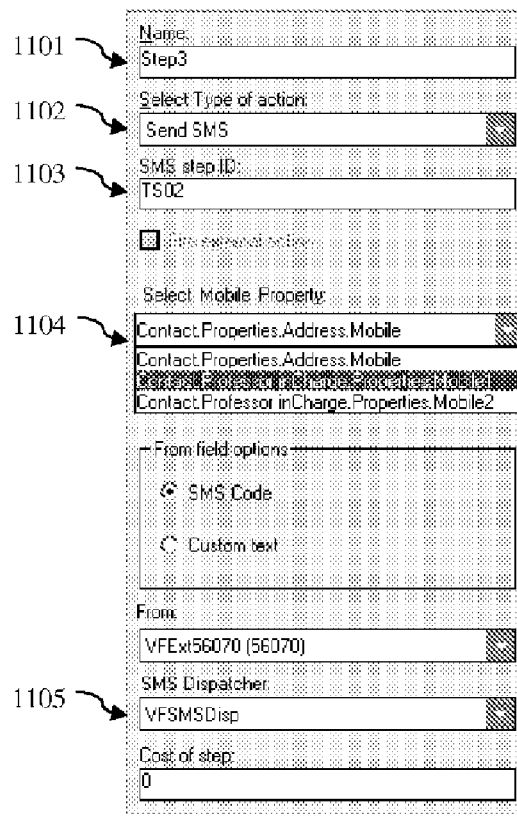
FIG. 11 is an exemplary screenshot of the User Interface displaying one way of selecting mobile number of the Related Object and the Base Object in a CRM application.

FIG. 11 is an exemplary screenshot of the User Interface displaying one way of selecting mobile number of the Related Object and the Base Object in a CRM application. A User Interface (FIG. 11) may be provided in the CRM application that may facilitate the selection of the mobile property of the Related Object and the Base Object in the form of a drop down list 1104. A list of all the mobile properties of the Base Objects and the Related Objects is retrieved from the application database and displayed on the drop down list 1104 on the User Interface. While defining the steps of a Campaign Workflow, the mobile property of the Base Object and the Related Object may be selected to whom the SMS message has to be transmitted during a campaign. For example in this case, if the SMS message is to be transmitted to the Base Object only, the first drop down menu item 'Contact.Properties.Address.Mobile' may be selected. In case, the SMS message is to be transmitted to the Related Object only, which is the Professor in the example, the menu item 'Contact.Professor in Charge.Properties.Mobile1' may be selected that will transmit the SMS message to the first mobile number of the Professor. In case, the SMS message has to be transmitted to both the base Object as well as the Related Object, the mobile property of the Base Object may be selected in one step and then the mobile property of the Related Object may be selected in another step and saved in the Campaign workflow. In such a case, the SMS messages are transmitted to both the Base Object and the Related Object when the campaign is run. The User Interface may have some other features such as a unique name 1101 may be assigned automatically to each step in the Campaign workflow. The type of action to be taken by the workflow may be selected from the drop down menu 1102 that may provide various options (not depicted in the FIG. 11). The options may include Make Call, Send Mailer or Send SMS Action etc. depending upon the requirements of the marketing campaign. The CRM user may select the service provider from the list of service providers from the drop down menu 1105 on the User Interface. After the campaign workflow is saved, all the information is stored in the application database.

Figure 12:
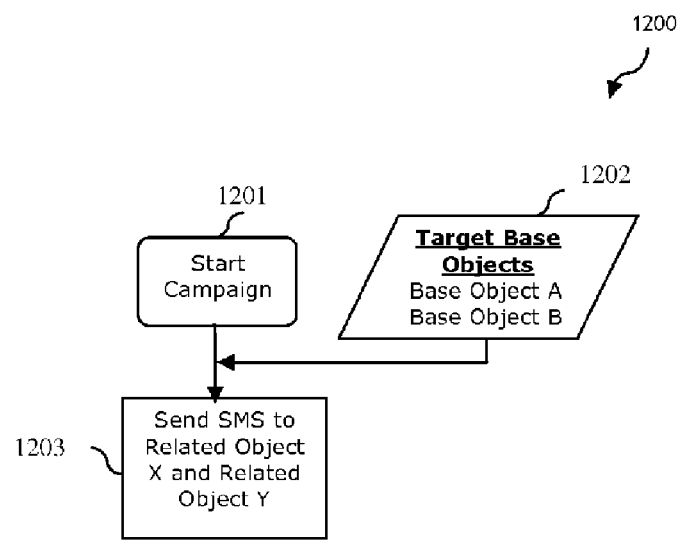
FIG. 12 is an exemplary Campaign Workflow to send SMS messages only to the Related Object in case of one-to-one relationship.

FIG. 12 is an exemplary Campaign Workflow to send SMS messages only to the Related Object in case of one-to-one relationship. In the exemplary Campaign Workflow 1200, represented in the form of a flowchart, there may be various events and actions through which a target contact may flow. As discussed with respect to FIG. 2, in a one-to-one relationship, each Base Object has only one Related Object. In the exemplary embodiment each of the Base Objects i.e. the Base Object A and the Base Object B has only one Related Object i.e. Related Object X and Related Object Y respectively. The Campaign starts at step 1201 by accessing the target Base Objects 1202 from the application database. In one embodiment of the present invention, the SMS message is transmitted only to the Related Objects where the Base Objects act as targets in the Campaign Workflow Thus in the exemplary workflow 1200, the targets i.e. the Base Objects A and Base Object B flow through the Campaign Workflow 1200. The targets progress to the send SMS message Action 1203 in the Campaign Workflow 1200 that includes an Action to send SMS message to the Related Object X and the Related Object Y. The Actions are processed and the SMS messages are dispatched to both the Related Objects. The relationship between the Objects may be defined through the User Interface (FIG. 10) while deploying the CRM application and the information is saved in the database. The content of the SMS Message is received by the Related Object X and the Related Object Y via corresponding SMS Service Provider selected in the send SMS message Action in the campaign workflow 1200. FIG. 12 is only an exemplary workflow with only two base Objects and two Related Objects though there is no restriction on the number of Objects. There may be any number of Base Objects in one-to-one relationship with any number of Related Objects in a campaign workflow.

Figure 13:
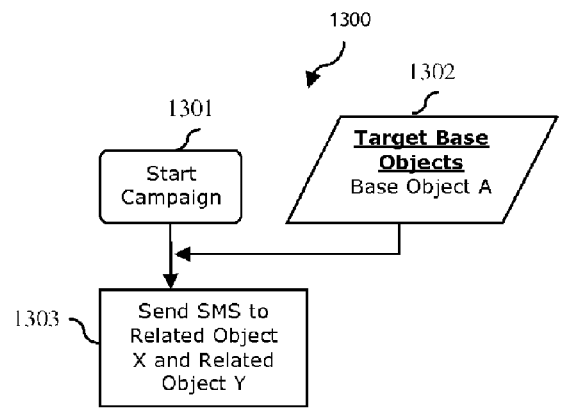
FIG. 13 is an exemplary Campaign Workflow to send SMS messages only to the Related Object in case of one-to-many relationship.

FIG. 13 is an exemplary Campaign Workflow to send SMS messages only to the Related Object in case of one-to-many relationship. As discussed with respect to FIG. 3, in a one-to-many relationship, each Base Object may have more than one Related Objects. In the exemplary embodiment, the Base Object i.e. the Base Object A has two Related Objects i.e. the Related Object X and the Related Object Y. The Campaign starts at step 1301 by accessing the target Base Object A 1302 from the application database. In one embodiment, the SMS message may be transmitted only to the Related Object where the Base Object A acts as a target that may flow through the Campaign Workflow 1300. The target progresses to the send SMS message Actions 1303 in the Campaign Workflow 1300 that include an Action to send SMS message to the Related Object X and the Related Object Y. The Action is processed and the SMS messages are dispatched to both of the Related Objects. The content of the SMS Message is received by the Related Object X and the Related Object Y via corresponding SMS Service Provider selected in the send SMS message Action in the campaign workflow 1300. FIG. 13 is only an exemplary workflow with only one Base Object and two Related Objects though there is no restriction on the number of Objects. There may be any number of Base Objects in one-to-many relationship with any number of Related Objects in a campaign workflow.

Figure 14:
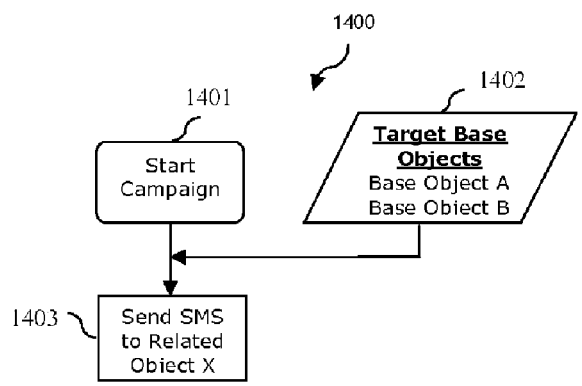
FIG. 14 is an exemplary Campaign Workflow to send SMS messages only to the Related Object in case of many-to-one relationship.

FIG. 14 is an exemplary Campaign Workflow to send SMS messages only to the Related Object in case of many-to-one relationship. As discussed with respect to FIG. 4, in a many-to-one relationship, more than one Base Objects may have only one Related Object. In the exemplary embodiment, both of the Base Objects i.e. the Base Object A and the Base Object B have only one Related Object i.e. the Related Object X. The Campaign starts at step 1401 by accessing the target Base Objects 1402 from the application database. In one embodiment of the present invention, the SMS message may be transmitted only to the Related Object where the Base Object A and Base Object B act as targets that may flow through the Campaign Workflow 1400. The targets progress to the send SMS message Action 1403 in the Campaign Workflow 1400 that includes an Action to send SMS message to the Related Object X. The Action is processed and the SMS message is dispatched to the Related Object X that is related to both, the Base Object A and the Base object B. The content of the SMS Message is received by the Related Object X through the corresponding SMS Service Provider selected in the send SMS message Action in the Campaign Workflow 1400. FIG. 14 is only an exemplary workflow with only two base Objects and one Related Object though there is no restriction on the number of Objects. There may be any number of Base Objects in many-to-one relationship with any number of Related Objects in a campaign workflow.

Figure 15:
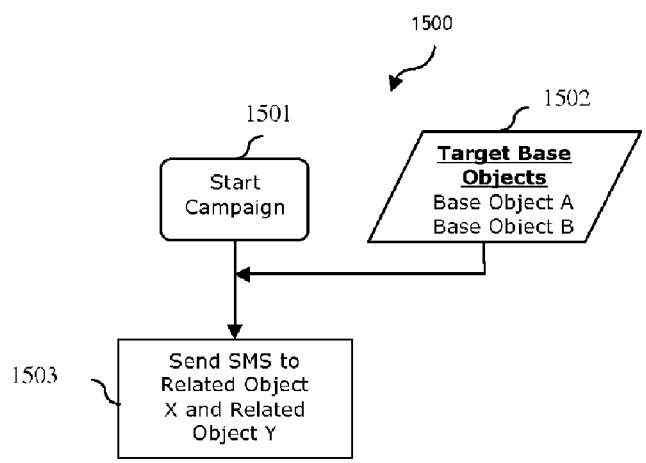
FIG. 15 is an exemplary Campaign Workflow to send SMS messages only to the Related Object in case of many-to-many relationship.

FIG. 15 is an exemplary Campaign Workflow to send SMS messages only to the Related Object in case of many-to-many relationship. As discussed with respect to FIG. 5, in a many-to-many relationship, more than one Base Objects may have more than one Related Objects. In the exemplary embodiment, the Base Object A has two Related Objects i.e. the Related Object X and the Related Object Y and similarly the Base Object B also has two Related Objects, i.e. the Related Object X and the Related Object Y. The Campaign starts at step 1501 by accessing the target Base Objects 1502 from the application database.

In one embodiment of the present invention, the SMS message may be transmitted only to the Related Objects where both the Base Objects A and the Base Object B, act as targets that flow through the Campaign Workflow 1500. The targets progress to the send SMS message Action 1503 in the Campaign Workflow 1500 that includes an Action to send SMS message to the Related Object X and the Related Object Y. The Actions is processed and the SMS messages are dispatched to the Related Object X and the Related Object Y. The content of the SMS Message is received by the Related Object X and Related Object Y through the corresponding SMS Service Provider selected in the send SMS message Action. FIG. 15 is only an exemplary workflow with only two base Objects and two Related Objects though there is no restriction on the number of Objects. There may be any number of Base Objects in many-to-many relationship with any number of Related Objects in a campaign workflow.

Figure 16:
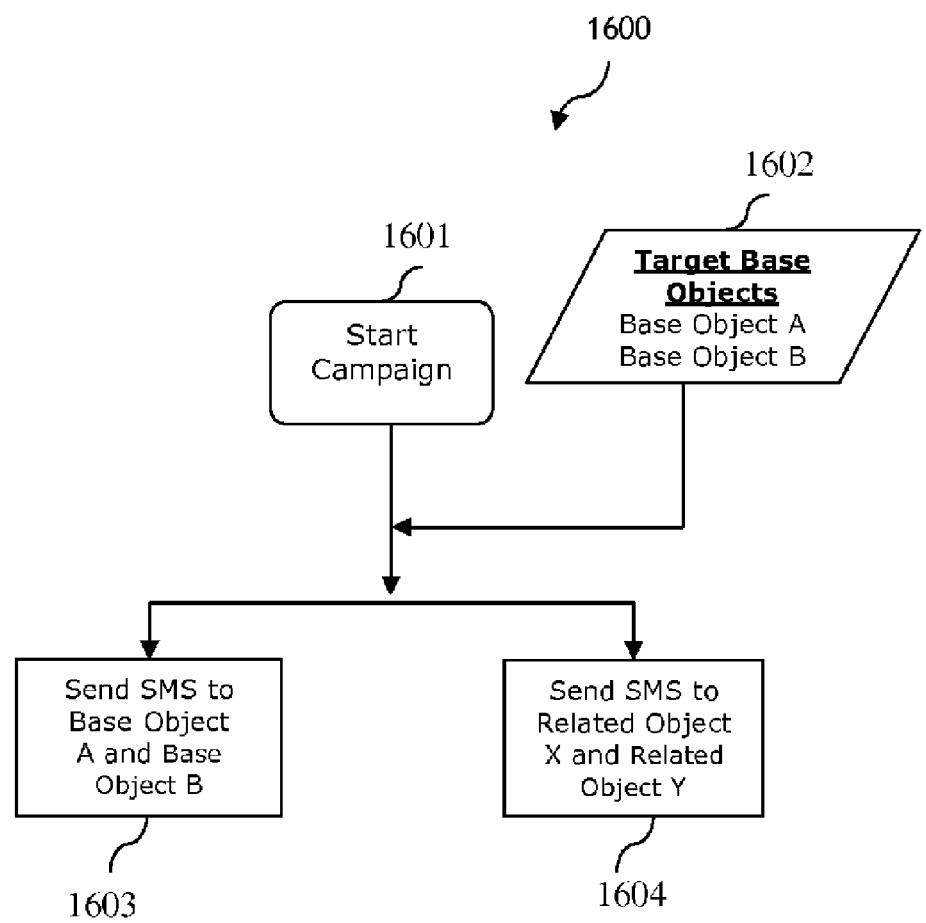
FIG. 16 is an exemplary Campaign Workflow to send SMS messages both to the Base Object as well as to the Related Object in accordance with one embodiment of the present invention.

FIG. 16 is an exemplary Campaign Workflow to send SMS messages both to the Base Object as well as to the Related Object in accordance with one embodiment of the present invention. In one embodiment, an SMS message may be transmitted to both the Base Object as well as to the Related Object simultaneously. The Campaign starts at step 1601 by accessing the target Base Objects 1602 from the application database. In this case, both the Base Object A as well as the Base Object B act as targets that flow through the Campaign Workflow 1600. The targets progress to the send SMS message Actions 1603, 1604 in the Campaign Workflow 1600 that include an Action to send SMS message to the Base objects and the Related Objects. The Actions are processed and the SMS messages are dispatched to the corresponding Objects. The content of the SMS Message is received by the targets (i.e. the Base Object A, Base Object B and the Related Object X and Related Object Y) through the corresponding SMS Service Provider selected in the send SMS message Action in the Campaign Workflow 1600. There may be any kind of relationship (explained with reference to FIG. 2, FIG. 3, FIG. 4 and FIG. 5) between the Base Objects and the Related Objects. FIG. 16 is only an exemplary workflow with only two base Objects and two Related Objects though there is no restriction on the number of Objects. There may be any number of Base Objects or Related Objects in the Campaign Workflow.

Figure 17:
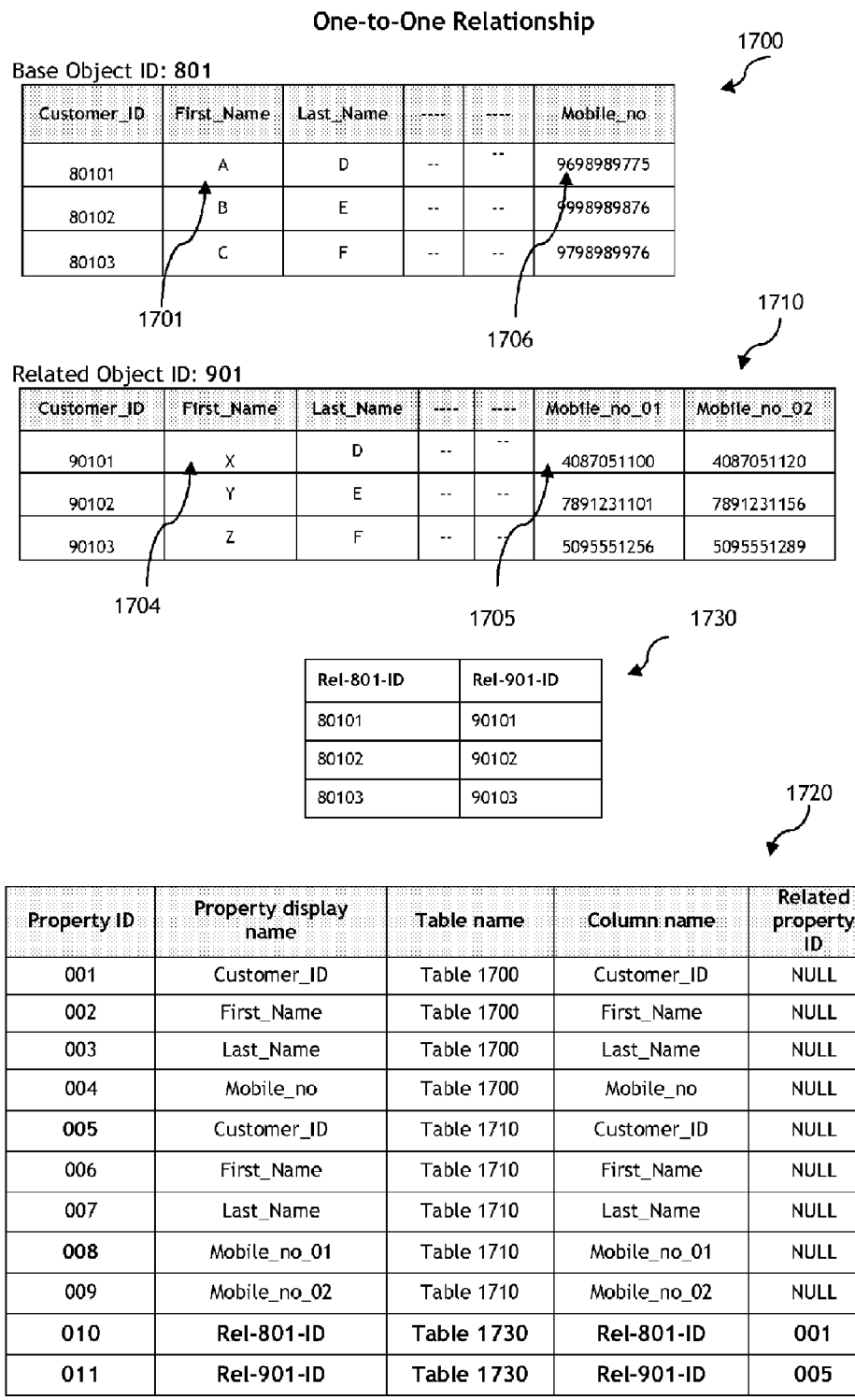
FIG. 17 illustrates a preferred structure of the database tables in case of one-to-one relationship, in accordance with one embodiment of the present invention.

Referring now to FIG. 17 that illustrates a preferred structure of the database tables in accordance with one embodiment of the present invention wherein the relationship between the Base Object and the Related Object is One-to-One. A contact is any individual or prospect who communicates the institution/organization via phone or email. In the exemplary embodiment, the Base Object database table 1700 stored in the application database may include separate database fields for Customer ID, First Name, Last Name, and Mobile number etc of the contact i.e. the Base Object. Typically, the database table may contain other relevant information as well, such as address, country, Zip code, email ID etc of the customer which is not displayed in the exemplary table 1700. Similarly, the Related Object database table 1710 stored in the application database may include database fields similar to the fields in the table 1700 for each of the Related Object that may be any parents, teachers or guidance counselors of the contact in the Base Object table 1700. Various records in both the tables (1700 and 1710) may be linked together based on a unique record identifier that is constant between them. Each contact record has a unique record identifier called as Customer_ID in the exemplary embodiments. Each of the database tables may have also have unique table identifier that helps in identifying and referring to a particular table while the query is constructed during the extraction process of the mobile number of a contact. In the exemplary embodiment, the table 1700 is given a unique table identifier (identifier) '801' referred to as the Base Object ID whereas the table 1710 is given a unique table identifier '901' referred to as the Related Object ID. In case of one-to-one relationship, another table 1730 is created where the unique Customer_ID of the Base Objects is mapped to the column Rel-801-ID and the unique Customer_ID of the Related Objects is mapped to the column Rel-901-ID. This table specifies if there is any Related Object belonging to the Base Object i.e. the contact. Another table 1720 may also be created that may contain information about all of the Base Objects and the Related Objects and the relationship between them, if any. A unique Property ID may be assigned to each of the fields or attributes of the Base Object and the Related Object and saved in the database. The Property ID is used to refer to a particular field or attribute with reference to the present invention. Mainly, the table 1720 may contain fields such as Property ID, Property display name, Table Name (name of the table to which the property belongs to), Column Name (actual name of the column or the field from where the property is mapped) and the Related Property ID (Property ID of the Related Object to which the record belongs to). The NULL value in the Related Property ID column indicates the absence of any parent Object, whereas a value in the column indicates the presence of a parent Object to which the property belongs to. For example, in the exemplary table 1720, the record 'Rel-801-ID' with Property ID '010' belongs to the record with a Property ID 001 (in table 1720) that is indicated by the presence of a value '001' in the Related Property ID column and similarly the record 'Rel-901-ID' with Property ID '011' belongs to the record with a Property ID 005 (in table 1720) that is indicated by the presence of a value '005' in the Related Property ID column. A NULL value in the Related Property ID column indicates the absence of any parent Object. This table 1720 is generally used to trace the table to which the mobile Property of the Related Object belongs to.

Referring now to FIG. 18 that illustrates a preferred structure of the database tables in accordance with one embodiment of the present invention wherein the relationship between the Base Object and the Related Object is one-to-many. In this case, each Base Objects may have more than one Related Objects. The unique Customer_ID of the Base Objects may be mapped from table 1800 to the column Rel-801-ID, in the Related Objects table 1810. Another table 1820 may be created that may contain information about all of the Base Objects and the Related Objects and the relationship between them, if any. In the exemplary table, 1820 the last record ' Rel-801-ID' with Property ID '010' belongs to the Base Object record with a Property ID 001 which is indicated by the presence of a value '001' in the Related Property ID column. The column 'Column name' in the table 1820 indicates the field name that has been mapped from the Base Object table to the Related Object table. In the exemplary table, the value 'Customer_ID' against the record 'Rel_801_ID' indicates that the values have been mapped from the column 'Customer_ID' of Base Object table 1800. A NULL value in the Related Property ID column indicates the absence of any parent Object.

Referring now to FIG. 19 that illustrates a preferred structure of the database tables in accordance with one embodiment of the present invention wherein the relationship between the Base Object and the Related Object is many-to-one. In this case there may be only one Related Object related to two or more Base Objects. In the exemplary table 1900, since there is only one customer with a Customer ID '90101' related to all of the Base Objects in table 1900, the unique Customer_ID i.e. 90101 of the Related Object may be mapped from table 1910 to the column Rel_901_ID, in table 1900. In this case also another table 1920 may be created that may contain information about all of the Base Objects and the Related Objects and the relationship between them, if any. In the exemplary table, 1920, the record ' Rel-901-ID' with Property ID '010' belongs to the property with a Property ID 005 that is indicated by the presence of a value '005' in the Related Property ID column. A NULL value in the Related Property ID column indicates the absence of any parent Object.

Figure 20:
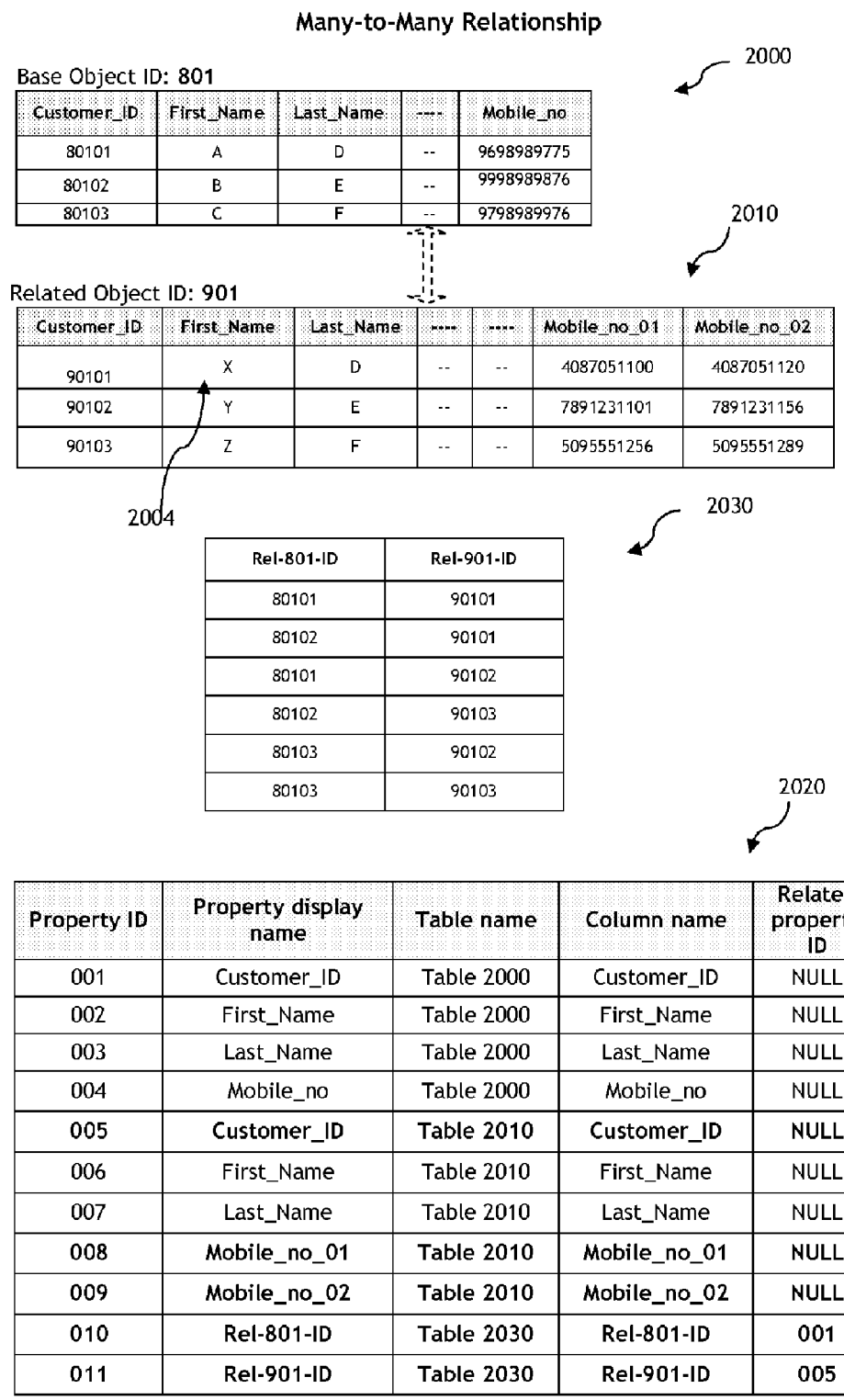
FIG. 20 illustrates a preferred structure of the database tables in case of many-to-many relationship, in accordance with one embodiment of the present invention.

Referring now to FIG. 20 that illustrates a preferred structure of the database tables in accordance with one embodiment of the present invention wherein the relationship between the Base Object and the Related Object is many-to-many. In case of many-to-many relationship, another table 2030 is created where the unique Customer_ID of the Base Objects is mapped to the column Rel-801-ID and the unique Customer_ID of the Related Objects is mapped to the column Rel-901-ID. This table specifies if there is any Related Object belonging to the Base Object. As can be observed form the table 2030, the record 80101 in the column Rel-801-ID has two Related Objects i.e. 90101 and 90102; similarly the record 80102 has two related Objects i.e. 90101 and 90103. Similarly other records have different number of records. Another table 2020 may also be created that may contain information about all of the Base Objects and the Related Objects and any relationship between them. In the exemplary table 2020, the record 'Rel-801-ID' with Property ID '010' belongs to the record with a Property ID '001' that is indicated by the presence of a value '001' in the Related Property ID column whereas the record ' Rel-901-ID' with Property ID '011' belongs to the record with a Property ID 005 that is indicated by the presence of a value '005' in the Related Property ID column. A NULL value in the Related Property ID column indicates the absence of any parent Object.

One-to-One Relationship

Figure 21:
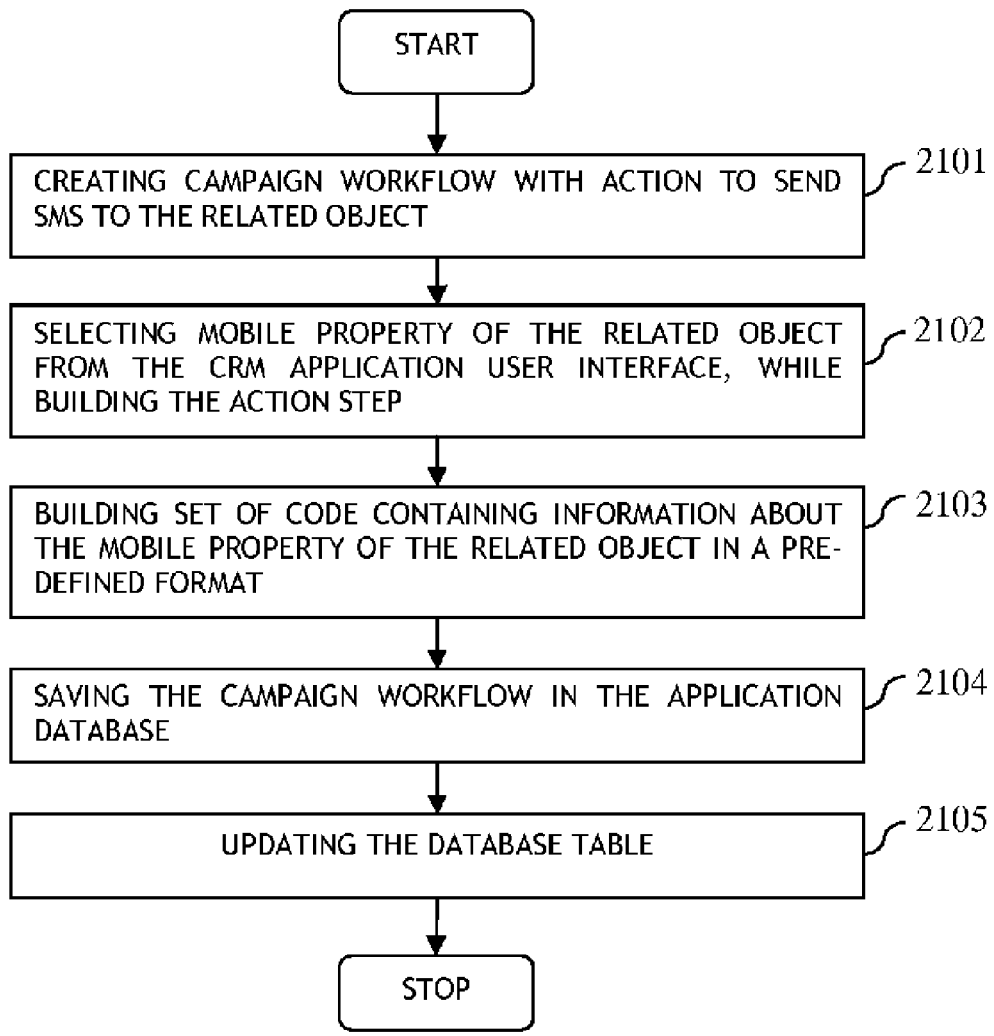
FIG. 21 is an exemplary process flow illustrating one approach of the actions performed by the method upon selection of a Related Object Mobile Property from the User Interface of the CRM application in accordance with the various embodiments of the present invention.

FIG. 21 is one approach of the actions performed by the method upon selection of the mobile property of the Related Object from the User Interface of the CRM application (FIG. 11), in accordance with one embodiment of the invention wherein the SMS message is sent to the Related Object in case of one-to-one relationship. In the exemplary embodiment, there are two Related Objects i.e. the Related Object X and the Related Object Y that are related to the Base Object A and the Base Object B, respectively; however there may be any number of Base Objects and each one may have a Related Object. At step 2101, a Campaign Workflow is created with send SMS Action in the CRM application. At step 2102, any one or more mobile properties 1104 (FIG. 11) of the Related Objects may be selected from the User Interface of the CRM application while building the Action step (FIG. 11) (The method of selection of mobile properties from the User Interface is described with reference to FIG. 11 in earlier sections). At step 2103, a method may be invoked that may build a set of code with respect to the selected mobile property of the Related Objects in a particular predefined format that may be described as <Mobile Property ID><Base Object ID><Related Object ID><Related Object Mapped Property ID><Fully Qualified Name of the property>. Two stars in a string act as delimiters that identify the beginning or the end of a string (a contiguous sequence of characters) and are used to separate the data items in a database. The delimiting character is not a part of the character string but these are used while extracting a substring from the saved string. Using this format, the set of code containing information about the mobile number of the Related Object X 1704 (Related Object ID 901, table 1710 in FIG. 17) may be stored as, for example: 008\*\*801\*\*901\*\*011\*\*Mobile_no_01 wherein '008' (table 1720 in FIG. 17) describes the Property ID of the Mobile property of the Related Object X 1704 (table 1710 in FIG. 17) to whom the SMS message has to be transmitted. '801' is the Base Object ID that refers to the table 1700 containing all the information about the Base Object A to whom the Related Object X is related to. '901' is the Related Object ID that refers to the table 1710 containing all the information about the Related Object X. '011' (table 1720 in FIG. 17) is the Property ID (i.e. Rel-901-ID) of the Related Object X which is mapped to the table 1730. Mobile_no_01 in the set of code describes the name of the mobile property and contains the first mobile number 1705 (table 1710, FIG. 17) of the Related Object X. At step 2104, upon saving the campaign, the set of code built at step 2103 may be saved in the application database that may be used later by the invented method to send SMS messages to the Related Object X and the Related object Y. The mobile numbers of both of the Related Objects and the content of the SMS message may be queued up in the database table created for the outbound SMS messages. At step 2105, the database table containing outbound SMS messages may be updated with this information. After this step the method concludes.

Figure 22:
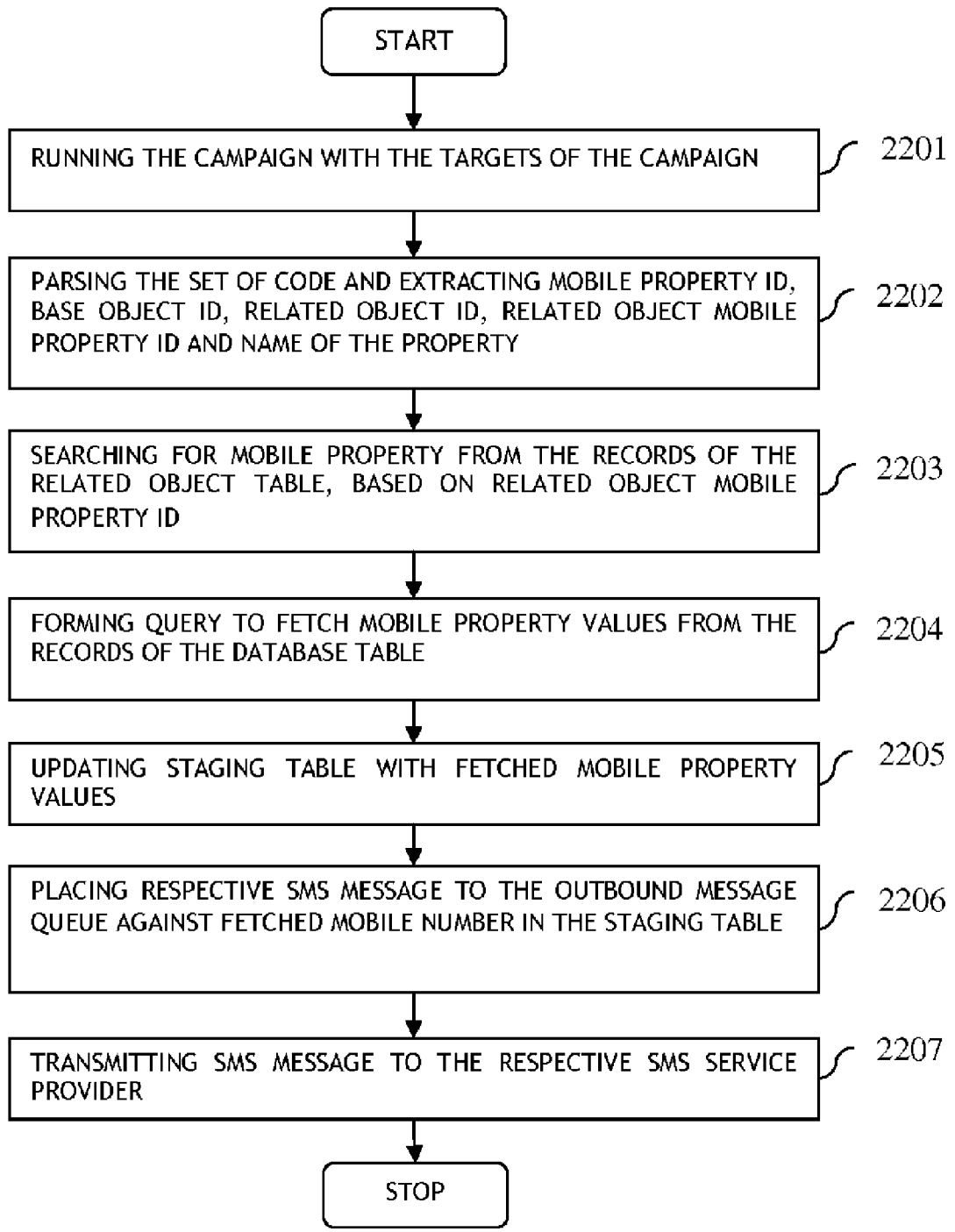
FIG. 22 is an exemplary process flow illustrating one approach of processing the set of code in order to transmit SMS messages to the Related Objects in accordance with the various embodiments of the present invention.

FIG. 22 is an exemplary process flow illustrating one approach of processing the set of code in order to transmit SMS messages to the Related Objects. At step 2201, the Campaign is run with the targets on a predefined date and time as entered in the Campaign Workflow. The method is invoked when the targets i.e. the Base Object A and the Base Object B, flow through the Campaign Workflow as described with respect to FIG. 12 and reach the Action 1203 (FIG. 12) which is send SMS message to the Related Object X and the Related Object Y. At step 2202 (FIG. 22), the method parses the set of code stored at step 2104 (FIG. 21) and further extracts the Mobile Property ID, Base Object ID, Related Object ID and Related Object Mapped Property ID from the string (stored as 008\*\*801\*\*901\*\*011\*\*Mobile_no_01 at step 2104 of FIG. 21). During the extraction process, first of all the method extracts the Property ID i.e. '008' and matches it with the Property ID stored in the table 1720 (FIG. 17). This Property ID is used to identify the table and the field name where the mobile property of the Related Objects exists. In the exemplary embodiment, the Property ID '008' represents the Mobile_no_01 1705 (table 1710) of the Related Object X. The method proceeds further till it finds a delimiter and extracts the Base Object ID i.e. '801' from the string. The Base Object ID is used to identify the database table 1700 belonging to the Base Object A. The method proceeds further till it finds a delimiter and extracts the Related Object ID that identifies the database table 1710 belonging to the Related Object X. In the exemplary embodiment, the Related Object ID assigned to the Related Object table is '901' (table 1710). In the next step 2203, based on the Related Object ID i.e. '901', the method searches for the mobile property i.e. the mobile number of the Related Object from various instances and records of the database table. This is done by matching the Related Object ID (e.g. 90101) stored in Rel-901-ID column in table 1730 (FIG. 17), with the one existing in the Related Object table 1710 (FIG. 17) in the column Customer ID. After this, the Property ID of the mapped property of the Related Object is extracted, which is '011' (table 1720, FIG. 17) in the exemplary embodiment. The method further matches the extracted Property ID with the Property ID stored in the table 1720 (FIG. 17). In the exemplary embodiment, the Property ID '011' (table 1720, FIG. 17) refers to the field Rel-901-ID in the table 1730 (FIG. 17) and the Related Property ID column with a value indicates the presence of a Related Object with Property ID '005' (FIG. 17). The method may further extract the mobile number of the Related Object from the extracted string by matching the column Mobile_no_1 in the Related Object table 1710 (FIG. 17). At step 2204, a dynamic SQL query may be built in order to fetch the Mobile property values of the Related Object X. At step 2205, the mobile property values i.e. the mobile numbers retrieved through the SQL query are saved in a staging table (FIG. 7) which is meant for the outbound SMS messages for a Campaign. Since this is the case of one-to-one relationship, there is only one Related Object X which is related to the Base Object A. Similarly mobile number of the second Related Object Y is also extracted in the same way. Any number of targets may flow through the campaign in the same way and the steps from 2201 to 2207 may be repeated. The mobile numbers of all of the Related Objects may be extracted and queued up in the staging table (FIG. 7) for each target. In the next step 2206, respective personalized SMS messages, meant for each of the Related Objects are placed against the fetched mobile number in the outbound SMS message queue in the exemplary staging table (FIG. 7). At step 2207, the SMS messages in the queue may be further transmitted to the respective SMS Gateways depending upon the Service Providers selected from the User Interface of the CRM application. After this step the method concludes.

One-to-Many Relationship

It is to be noted that the steps performed by the invented method (FIG. 21 and FIG. 22) remain the same in case of one-to-one, many-to-one, one-to-many and many-to-many. Their explanation is provided for the purpose of clear understanding of the method with respect to the tables in FIG. 18, FIG. 19 and FIG. 20. Thus in accordance with another embodiment of the invention, FIG. 21 also describes the process flow of the invented method wherein the SMS message may be sent to the Related Object in case of one-to-many relationship. In the exemplary embodiment, there are two Related Objects: Related Object X and Related Object Y, both related to one Base Object A, however there may be any number of Objects Related to one Base Object. At step 2101, a Campaign Workflow is created with send SMS Action in the CRM application. At step 2102, any one or more mobile properties 1104 (FIG. 11) of each of the Related Objects may be selected from the User Interface of the CRM application (FIG. 11) and saved in the application database during creation of a Campaign Step (The method of selection of mobile properties from the User Interface is described with reference to FIG. 11 in earlier sections). At step 2103 (FIG. 21), a method may be invoked that may build a set of code with respect to the selected mobile property of the Related Object in a particular pre-defined format that may be described as <Mobile Property ID><Base Object ID><Related Object ID><Related Object Mapped Property ID><Fully Qualified Name of the property>. Using this format, the set of code containing information about the mobile number of the Related Object X 1804 (Related Object ID 901, table 1810 in FIG. 18) may be stored as, for example: 008\*\*801\*\*901\*\*010\*\*Mobile_no_01 wherein '008' (table 1820 in FIG. 18) describes the Property ID Mobile property of the Related Object in table 1810 in FIG. 18, to whom the SMS message has to be transmitted. '801' is the Base Object ID that refers to the table 1800 containing all the information about the Base Object A, to whom the Related Object X is related to. '901' is the Related Object ID that refers to the table 1810 containing all the information about the Related Object X. '010' (table 1820 in FIG. 18) is the Property ID (i.e. Rel-801-ID) of the Base Object A which is mapped to the Related Object table 1810. Mobile_no_01 describes the name of the mobile property and contains the first mobile number 1805 (table 1810, FIG. 18) of the Related Object X. Similarly, depending upon the number of the Related Objects, information about each of the Related Objects may be stored in the application database. At step 2104, upon saving the campaign, the set of code built at step 2103 may be saved in the application database that may be used later by the invented method to send SMS messages to the Related Object. The mobile numbers of the Related Object (Related Object X and Related Object Y) and the content of the SMS message may be queued up in the database table created for the outbound SMS messages. At step 2105, the database table containing outbound SMS messages may be updated with this information. After this step the method concludes.

FIG. 22 is an exemplary process flow illustrating one approach of processing the set of code in order to transmit SMS messages to the Related Objects. At step 2201, the Campaign is run, with the targets of the campaign, on a predefined date and time as entered in the Campaign Workflow. The method is invoked when the target i.e. the Base Object A flows through the Campaign Workflow as described with respect to FIG. 13 and reaches the Action send SMS message to the Related Object X and Related Object Y 1303 (FIG. 13) in the Campaign Workflow. At step 2202 (FIG. 22), the method parses the set of code stored at step 2103 (FIG. 21) and further extracts the Mobile Property ID, Base Object ID, Related Object ID and Related Object Mapped Property ID from the string (stored as 008\*\*801\*\*901\*\*010\*\*Mobile_no_01 at step 2104 of FIG. 21). During the extraction process, first of all the method extracts the Property ID i.e. '008' and matches it with the Property ID stored in the table 1820 (FIG. 18). This Property ID is used to identify the table and the field name where the mobile property of the Related Object X exists. In the exemplary embodiment, the Property ID '008' represents the Mobile_no_01 (table 1810) of the Related Object X. The method proceeds further till it finds a delimiter and extracts the Base Object ID i.e. '801' from the string. The Base Object ID is used to identify the database table 1800 belonging to the Base Object A. The method proceeds further till it finds a delimiter and extracts the Related Object ID that identifies the database table 1810 belonging to the Related Object X. In the exemplary embodiment, the Related Object ID assigned to the Related Object table is '901' (table 1810). In the next step 2203, based on the Related Object ID i.e. '901', the method searches for the mobile property i.e. the mobile number of the Related Object from various instances and records of the database table 1810. After this, the Property ID of the mapped property of the Base Object A is extracted, which is '010' (table 1820, FIG. 18) in the exemplary embodiment. The method further matches the extracted Property ID with the Property ID stored in the table 1820 (FIG. 18). In the exemplary embodiment, the Property ID '010' (table 1820, FIG. 18) refers to the field Rel-801-ID in the table 1810 (FIG. 18) and the Related Property ID column with a value indicates the presence of a Related Object X with Property ID '005' (FIG. 18). The method may further extract the mobile number of the Related Object X from the extracted string by matching the column Mobile_no_1 in the Related Object table 1810 (FIG. 18). At step 2204, a dynamic SQL query may be built in order to fetch the Mobile property values of the Related Object X. At step 2205, the mobile property values i.e. the mobile numbers retrieved through the SQL query are saved in a staging table (FIG. 7) which is meant for the outbound SMS messages in a Campaign. Since this is the case of one-to-many relationship, there is more than one Related Objects which is related to the Base Object A. Similarly any number of targets may flow through the campaign in a similar fashion and the steps from 2201 to 2207 (FIG. 22) may be repeated. The mobile numbers of all of the Related Objects may be extracted and queued up in the staging table (FIG. 7) in the same way. In the next step 2206, respective personalized SMS messages, meant for each of the Related Objects, are placed against the fetched mobile number in the outbound SMS message queue in the exemplary staging table (FIG. 7). At step 2207, the SMS messages in the queue may be further transmitted to the respective SMS Gateways depending upon the Service Providers selected from the User Interface of the CRM application. After this step the method concludes.

Many-to-One Relationship

In accordance with one embodiment of the invention, FIG. 21 describes the process flow of the invented method wherein the SMS message may be sent to the Related Object in case of many-to-one relationship. In the exemplary embodiment, there is only one Related Object i.e. Related Object X related to the two Base Objects i.e. the Base Object A and the Base Object B, however there may be any number of Base Objects and two or more of them may have only one Related Object. At step 2101, a Campaign Workflow is created with send SMS Action in the CRM application. At step 2102, any one or more mobile properties 1104 (FIG. 11) of the Related Object may be selected from the User Interface (FIG. 11) and saved in the application database (The method of selection of mobile properties from the User Interface is described with reference to FIG. 11 in earlier sections). At step 2103, a method may be invoked that may build a set of code with respect to the selected mobile property of the Related Object in a particular pre-defined format that may be described as <Mobile Property ID><Base Object ID><Related Object ID><Related Object Mapped Property ID><Fully Qualified Name of the property>. Using this format, the set of code containing information about the mobile number of the Related Object X 1904 (Related Object ID 901, table 1910 in FIG. 19) may be stored as, for example: 008\*\*801\*\*901\*\*010\*\*Mobile_no_01 wherein '008' (table 1920 in FIG. 19) describes the Property ID of the Related Object X 1904 (table 1910 in FIG. 19) to whom the SMS message has to be transmitted, '801' is the Base Object ID that refers to the table 1900 containing all the information about the Base Object A. '901' is the Related Object ID that refers to the table 1910 containing all the information about the Related Object X. '010' (table 1920 in FIG. 19) is the Property ID (i.e. Rel-901-ID) of the Related Object X which is mapped to the Base Object table 1900. Mobile_no_01 describes the name of the mobile property and contains the first mobile number 1905 (table 1910, FIG. 19) of the Related Object. Similarly the set of code for other Related Objects may also be created in the same way. At step 2104, upon saving the campaign, the set of code built at step 2103 may be saved in the application database that may be used later by the invented method to send SMS messages to the Related Object. The mobile number of the Related Object X and the content of the SMS message may be queued up in the database table created for the outbound SMS messages. At step 2105, the database table containing outbound SMS messages may be updated with this information. After this step the method concludes.

FIG. 22 is an exemplary process flow illustrating one approach of processing the set of code in order to transmit SMS messages to the Related Objects. At step 2201, the Campaign is run, with the targets of the campaign, on a predefined date and time as entered in the Campaign Workflow. The method is invoked when the targets i.e. the Base Object A and the Base Object B, flow through the Campaign Workflow as described with respect to FIG. 14 and reach the Action 1403 (FIG. 14) which is send SMS message to the Related Object X in the Campaign Workflow. At step 2202 (FIG. 22), the method parses the set of code stored at step 2103 (FIG. 21) and further extracts the Mobile Property ID, Base Object ID, Related Object ID and Related Object Mapped Property ID from the string (stored as 008801901010Mobile_no_01 at step 2104 of FIG. 21). During the extraction process, first of all the method extracts the Property ID i.e. '008' and matches it with the Property ID stored in the table 1920 (FIG. 19). This Property ID is used to identify the table and the field name where the mobile property of the Related Object exists. In the exemplary embodiment, the Property ID '008' represents the Mobile_no_01 1905 (table 1910) of the Related Object. The method proceeds further till it finds a delimiter and extracts the Base Object ID i.e. '801' from the string. The Base Object ID is used to identify the database table 1900 belonging to the Base Object A. The method proceeds further till it finds a delimiter and extracts the Related Object ID that identifies the database table 1910 belonging to the Related Object. In the exemplary embodiment, the Related Object ID assigned to the Related Object table is '901' (table 1910). In the next step 2203, based on the Related Object ID i.e. '901', the method searches for the mobile property i.e. the mobile number of the Related Object from various instances or records of the database table. After this, the Property ID of the mapped property of the Related Object is extracted, which is '010' (table 1920, FIG. 19) in the exemplary embodiment. The method further matches the extracted Property ID with the Property ID stored in the table 1920 (FIG. 19). In the exemplary embodiment, the Property ID '010' (table 1920, FIG. 19) refers to the field Rel-901-ID in the table 1900 (FIG. 19) and the Related Property ID column (table 1920, FIG. 19) with a value indicates the presence of a Related Object with Property ID '005' (FIG. 19). The method may further extract the mobile number of the Related Object from the extracted string by matching the column Mobile_no_1 in the Related Object table 1910 (FIG. 19). At step 2204, a dynamic SQL query may be built in order to fetch the Mobile property values of the Related Object. At step 2205, the mobile property values i.e. the mobile numbers retrieved through the SQL query are saved in a staging table (FIG. 7) which is meant for the outbound SMS messages for a Campaign. Since this is the case of many-to-one relationship, there is only one Related Object X which is related to both, the Base Object A as well as the Base Object B. Similarly any number of targets may flow through the campaign (depending upon the number of Base Objects related to the Related Objects) in the same way and the steps from 2201 to 2207 may be repeated. The mobile numbers of the Related Object may be extracted and queued up in the staging table (FIG. 7) in the same way. In the next step 2206, respective personalized SMS messages, meant for the Related Object X, are placed against the fetched mobile number in the outbound SMS message queue in the exemplary staging table (FIG. 7). At step 2207, the SMS messages in the queue may be further transmitted to the respective SMS Gateways depending upon the Service Providers selected from the User Interface of the CRM application. After this step the method concludes.

Many-to-Many Relationship

In accordance with one embodiment of the invention, FIG. 21 describes the process flow of the invented method wherein the SMS message may be sent to the Related Object in case of many-to-many relationship. In the exemplary embodiment, there are two Related Objects i.e. the Related Object X and Related Object Y related to both of the two Base Objects i.e. the Base Object A and the Base Object B simultaneously, however there may be any number of Base Objects and two or more of them may have two or more Related Objects simultaneously. At step 2101, a Campaign Workflow is created with send SMS Action in the CRM application. At step 2102, any one or more mobile properties 1104 (FIG. 11) of the Related Object may be selected from the User Interface (FIG. 11) and saved in the application database (The method of selection of mobile properties from the User Interface is described with reference to FIG. 11 in earlier sections).

At step 2103, a method may be invoked that may build a set of code with respect to the selected mobile property of the Related Object in a particular pre-defined format that may be described as <Mobile Property ID><Base Object ID><Related Object ID><Related Object Mapped Property ID><Fully Qualified Name of the property>. Using this format, the set of code containing information about the mobile number of the Related Object X 2004 (Related Object ID 901, table 2010 in FIG. 20) may be stored as, for example: 008801901011Mobile_no_01 wherein '008' (table 2020 in FIG. 20) describes the Property ID of the Related Object X 2004 (table 2010 in FIG. 20) to whom the SMS message has to be transmitted. '801' is the Base Object ID that refers to the table 2000 containing all the information about the Base Object A to whom the Related Object X is related to. '901' is the Related Object ID that refers to the table 2010 containing all the information about the Related Object X. '011' (table 2020 in FIG. 20) is the Property ID (i.e. Rel-901-ID) of the Related Object X. Mobile_no_01 describes the name of the mobile property and contains the first mobile number 2005 (table 2010, FIG. 20) of the Related Object X. In case of many-to-many relationship, both the Base Object A and the Base Objects B may have two or more Related Objects and they may have some common Related Objects as well. At step 2104, upon saving the campaign, the set of code built at step 2103 may be saved in the application database that may be used later by the invented method to send SMS messages to the Related Object. The mobile numbers of all of the Related Objects and the content of the SMS message may be queued up in the database table created for the outbound SMS messages. At step 2105, the database table containing outbound SMS messages may be updated with this information. After this step the method concludes.

FIG. 22 is an exemplary process flow illustrating one approach of processing the set of code in order to transmit SMS messages to the Related Objects. At step 2201, the Campaign is run, with the targets of the campaign, on a predefined date and time as entered in the Campaign Workflow. The method is invoked when the targets i.e. the Base Object A and the Base Object B flow through the Campaign Workflow as described with respect to FIG. 15 and reach the Action 1503 (FIG. 15) which is send SMS message to the Related Object X and the Related Object Y. At step 2202 (FIG. 22), the method parses the set of code stored at step 2103 (FIG. 21) and further extracts the Mobile Property ID, Base Object ID, Related Object ID and Related Object Mapped Property ID from the string (stored as 008801901011Mobile_no_01 at step 2104 of (FIG. 21). During the extraction process, first of all the method extracts the Property ID i.e. '008' and matches it with the Property ID stored in the table 2020 (FIG. 20). This Property ID is used to identify the table and the field name where the mobile property of the Related Object exists. In the exemplary embodiment, the Property ID '008' represents the Mobile_no_01 2005 (table 2010) of the Related Object. The method proceeds further till it finds a delimiter and extracts the Base Object ID i.e. '801' from the string. The Base Object ID is used to identify the database table 2000 belonging to the Base Object A. The method proceeds further till it finds a delimiter and extracts the Related Object ID that identifies the database table 2010 belonging to the Related Object. In the exemplary embodiment, the Related Object ID assigned to the Related Object table is '901' (table 2010). In the next step 2203, based on the Related Object ID i.e. '901', the method searches for the mobile property i.e. the mobile number of the Related Object from various instances or records of the database table. This is done by matching the Related Object ID (e.g. 90101) stored in Rel-901-ID column in table 2030 (FIG. 20), with the one existing in the Related Object table 2010 (FIG. 20) in the column Customer_ID. After this, the Property ID of the mapped property of the Related Object is extracted, which is '011' (table 2020, FIG. 20) in the exemplary embodiment. The method further matches the extracted Property ID with the Property ID stored in the table 2020 (FIG. 20). In the exemplary embodiment, the Property ID '011' (table 2020, FIG. 20) refers to the field Rel-901-ID in the table 2030 (FIG. 20) and the Related Property ID column with a value indicates the presence of a Related Object with Property ID '005' (FIG. 20). The method may further extract the mobile number of the Related Object from the extracted string by matching the column Mobile_no_1 in the Related Object table 2010 (FIG. 20). At step 2204, a dynamic SQL query may be built in order to fetch the Mobile property values of the Related Object. At step 2205, the mobile property values i.e. the mobile numbers retrieved through the SQL query are saved in a staging table (FIG. 7) which is meant for the outbound SMS messages for a Campaign. Since this is the case of many-to-many relationship, both the Base Object A and the Base Objects B may have more than one Related Object and they may have some common Related Objects as well. Similarly any number of targets may flow through the campaign in a similar fashion and the steps from 2201 to 2207 (FIG. 22) may be repeated. The mobile numbers of all of the Related Objects may be extracted and queued up in the staging table (FIG. 7) in the same way. In the next step 2206, respective personalized SMS messages, meant for each of the Related Objects, are placed against the fetched mobile number in the outbound SMS message queue in the exemplary staging table (FIG. 7). At step 2207, the SMS messages in the queue may be further transmitted to the respective SMS Gateways depending upon the Service Providers selected from the User Interface of the CRM application. After this step the method concludes.

Both the Base Object and the Related Object

In accordance with one more embodiment, the SMS message may be sent to both, the Base Object as well as the Related Object, simultaneously. In this embodiment of the invention, the first drop down menu item 'Contact.Properties.Address.Mobile' may be selected from the drop down menu 1104 (FIG. 11) in the User Interface. The Actions in the Campaign workflow have been explained with respect to FIG. 16 in the earlier section of the detailed description. In this embodiment, one or more Base Objects act as targets that may flow through the Campaign Workflow. The targets progress to the send SMS message Action 1603 (FIG. 16) in the Campaign Workflow that includes an Action to send SMS message to the Base Object. The Action is processed and the SMS message is dispatched to the Base Object. The targets further progresses to the send SMS message Action 1604 (FIG. 16) in the Campaign Workflow that includes an Action to send SMS message to the Related Object which is related to the Base Object. Here, the relationship between the Base Object and the Related Object may be any one of one-to-one, one-to-many, many-to-one or many-to-many (explained with reference to FIG. 2, FIG. 3, FIG. 4 and FIG. 5). Similarly, the targets further progress to the rest of the Actions in the Campaign Workflow and process the Action to transmit the SMS message to the Base Objects and their Related Objects. The content of the SMS Message is received by the targets through the corresponding SMS Service Provider selected in the send SMS message Action.

Figure 23:
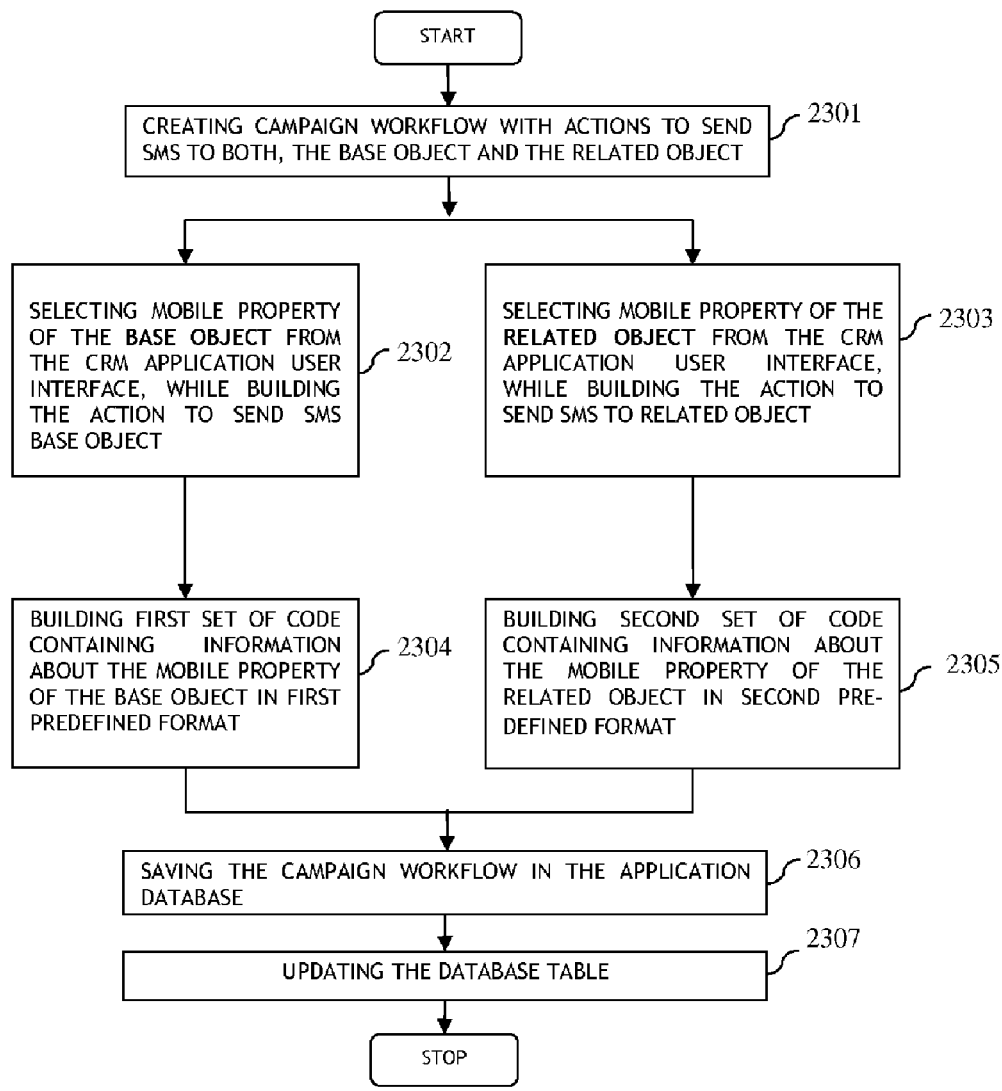
FIG. 23 is an exemplary process flow illustrating one approach of the actions performed by the method upon selection of a Base Object Mobile Property from the User Interface of the CRM application in accordance with the various embodiments of the present invention.

Referring now to FIG. 23 that describes the actions performed by the method upon selection of a Base Object mobile property i.e. 'Contact.Properties.Address.Mobile' from the drop down menu on the User Interface (FIG. 11) according to one embodiment wherein the SMS message is sent to both, the Base Object as well as the Related Object. In this exemplary embodiment, the steps performed to send SMS only to the Base Object are described since the steps performed to send SMS to Related Objects are explained in the earlier sections of the description in details (with respect to FIG. 21 and FIG. 22). At step 2301, a campaign workflow is created with send SMS Action to send SMS to both the Base Object and the Related Object. At step 2302, the mobile property of the Base Object is selected from the User Interface (FIG. 11) while building the Action step to send SMS to the Base Object. At step 2303, the mobile property of the Related Object is selected from the User Interface (FIG. 11) while building the Action step to send SMS to the Related Object. At step 2304, a method may be invoked that may build a first set of code with respect to the selected mobile property of the Base Object in a first pre-defined format that may be described as <Mobile Property ID><Base Object ID><Fully Qualified Name of the property>. Two stars in a string act as delimiters. Using this format, the first set of code containing information about the mobile number of the Base Object A 1701 (Base Object ID 801, table 1710 in FIG. 17) may be stored as, for example: 004801Mobile_no_01 wherein '004' (table 1720 in FIG. 17) describes the Property ID of the Base Object A 1701 (table 1710 in FIG. 17) to whom the SMS message has to be transmitted. '801' is the Base Object ID that refers to the table 1700 containing all the information about the Base Object A. Mobile_no_01 describes the name of the mobile property and contains the first mobile number 1706 (table 1700, FIG. 17) of the Base Object A. At step 2305, another method may be invoked that may simultaneously build a second set of code with respect to the selected mobile property of the Related Object in a second pre-defined format that may be described as <Mobile Property ID><Base Object ID><Related Object ID><Related Object Mapped Property ID><Fully Qualified Name of the property> (as explained in earlier sections). At step 2306, upon saving the campaign, the two sets of code built at step 2304 and 2305 may be saved in the application database that may be used later by the invented method to send SMS messages to the Base Object and the Related Object. Likewise, any number of targets may flow through the campaign in a similar fashion and the above steps may be repeated accordingly. The mobile number of the Base Objects and the Related Objects along with the content of the SMS message may be queued up in the database table created for the outbound SMS messages. At step 2307, the database table containing outbound SMS messages may be updated with this information. After this step the method concludes.

Figure 24:
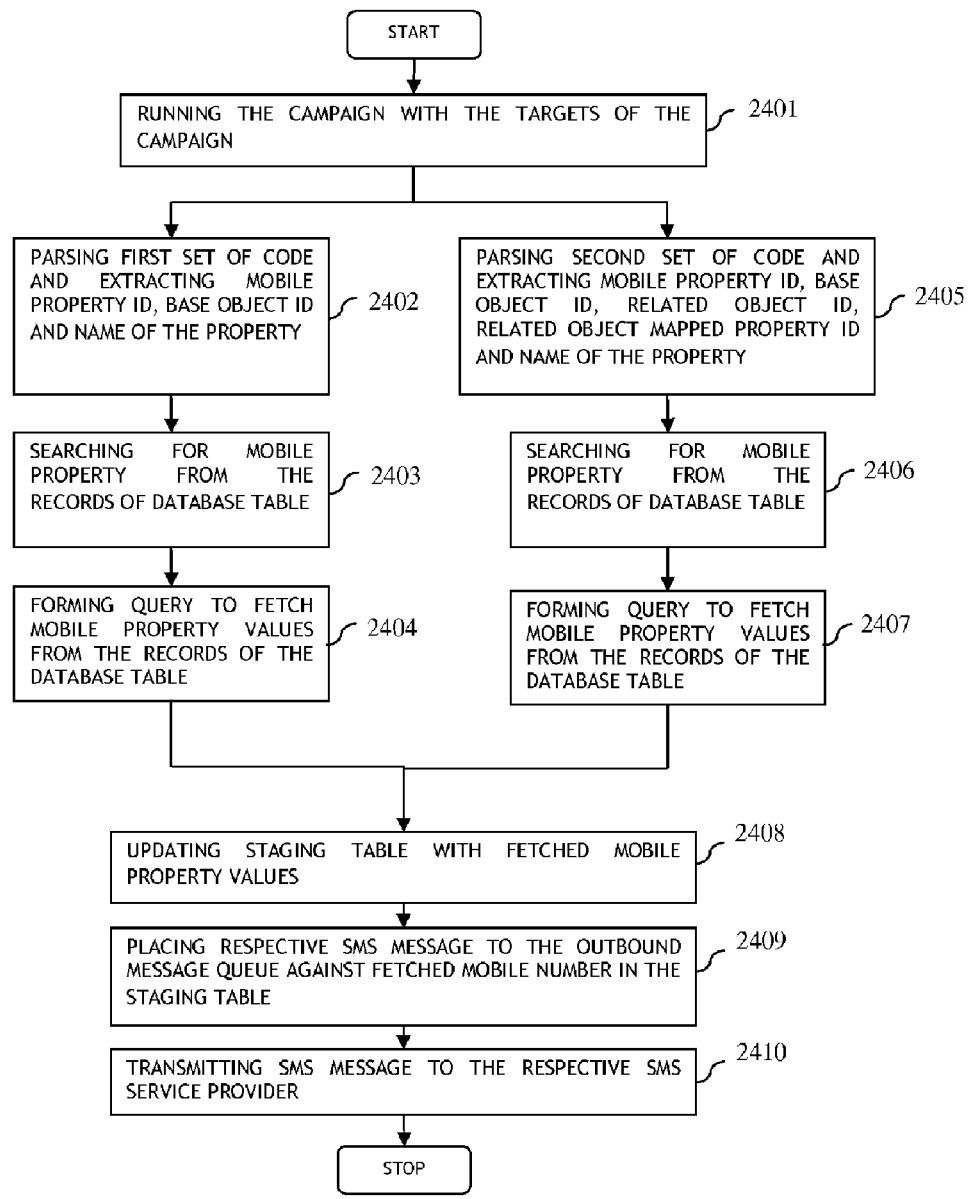
FIG. 24 is an exemplary process flow illustrating one approach of processing the set of code in order to transmit SMS messages to the Base Object in accordance with the various embodiments of the present invention.

FIG. 24 is an exemplary process flow illustrating one approach of processing the set of code in order to transmit SMS messages to the Base Object. At step 2401, the Campaign is run, with the targets of the campaign, on a predefined date and time as entered in the Campaign Workflow. The method is invoked when the targets i.e. the Base Object A and the Base Object B flow through the Campaign Workflow as described with respect to FIG. 16 and reach the Actions 1603, 1604 (FIG. 16) which is send SMS message to the Base Object A, Base Object B, Related Object X and Related Object Y in the Campaign Workflow. Depending upon the number of Base Objects and the Related Objects, a method may be called that parses the mobile property simultaneously from the set of code generated at steps 2304 and 2305 (FIG. 23). Thus at step 2402 (FIG. 24), the method parses the first set of code stored at step 2304 (FIG. 23) and further extracts the Mobile Property ID, Base Object ID and from the string (stored as **004\*\*801\*\*Mobile_no_01). During the extraction process, first of all the method extracts the Property ID i.e. '004' of the Base Object A and matches it with the Property ID stored in the table 1720 (FIG. 17). This Property ID is used to identify the table and the field name where the mobile property of the Related Object A exists. In the exemplary embodiment, the Property ID '004' (table 1720) represents the Mobile_no_1 1706 (table 1700) of the Base Object A. The method proceeds further, till it finds a delimiter and extracts the Base Object ID i.e. '801' from the string. The Base Object ID is used to identify the database table 1700 belonging to the Base Object A. In the next step 2403, the method searches for the mobile property i.e. the mobile number of the Base Object from various instances and records of the database table. The method may further extract the mobile number of the Base Object A from the extracted string by matching the column Mobile_no_1 in the Base Object table 1700 (FIG. 17). At step 2404, a dynamic SQL query may be built in order to fetch the Mobile property values of the Base Object A. Another method may be called simultaneously after step 2401, which parses and extracts the mobile property of the Related Object in the same way (described in detail with respect to FIG. 22). At step 2405, the method parses the second set of code stored at step 2305 (FIG. 23) and further extracts the Mobile property ID, Base Object ID, Related Object ID, Related Object Mapped Property ID and name of the property from the string. At step 2406, based on the Related Object ID, the method searches for the mobile property i.e. the mobile number of the Related Object from various instances or records of the database table. In the next step 2407, a dynamic SQL query may be built in order to fetch the Mobile property values of the Related Object X. At step 2408, the mobile property values i.e. the mobile numbers retrieved through the SQL query are saved in a staging table (FIG. 7) which is meant for the outbound SMS messages for a Campaign. Similarly, any number of targets may progress through the send SMS message Action 1204 (FIG. 12) that includes an Action to send SMS message to the Base Objects and the Related Objects and when they reach the Action to send SMS message to the Related Objects, the methods described with respect to FIG. 21 and FIG. 22 are performed, depending upon the kind of relationship between the Objects. The mobile numbers of all of the Base Objects and the Related Objects may be extracted and queued up in the staging table (FIG. 7) in the same way for each target. In the next step 2409, respective personalized SMS messages, meant for each of the Related Objects and the Base Objects are placed against the fetched mobile number in the outbound SMS message queue in the exemplary staging table (FIG. 7). At step 2410, the SMS messages in the queue may be further transmitted to the respective SMS Gateways depending upon the Service Providers selected from the User Interface of the CRM application. After this step the method concludes. In this embodiment, when the message has to be transmitted to the Related Objects, the steps performed by the method remain the same (as described with respect to FIG. 21 and FIG. 22** in the previous sections).

It will be appreciated that more or fewer processes may be incorporated into the methods illustrated in FIG. 21, FIG. 22, FIG. 23 and FIG. 22 without departing from the scope of the invention and that no particular order is implied by the arrangement of blocks shown and described herein. It should be noted that the algorithms of the system disclosed herein, illustrated with the use flow charts, are multithreaded event driven algorithms. Therefore, the system is capable of simultaneously sending and receiving a plurality of messages to support requests from one or more users, as the case may be.

Figure 25:
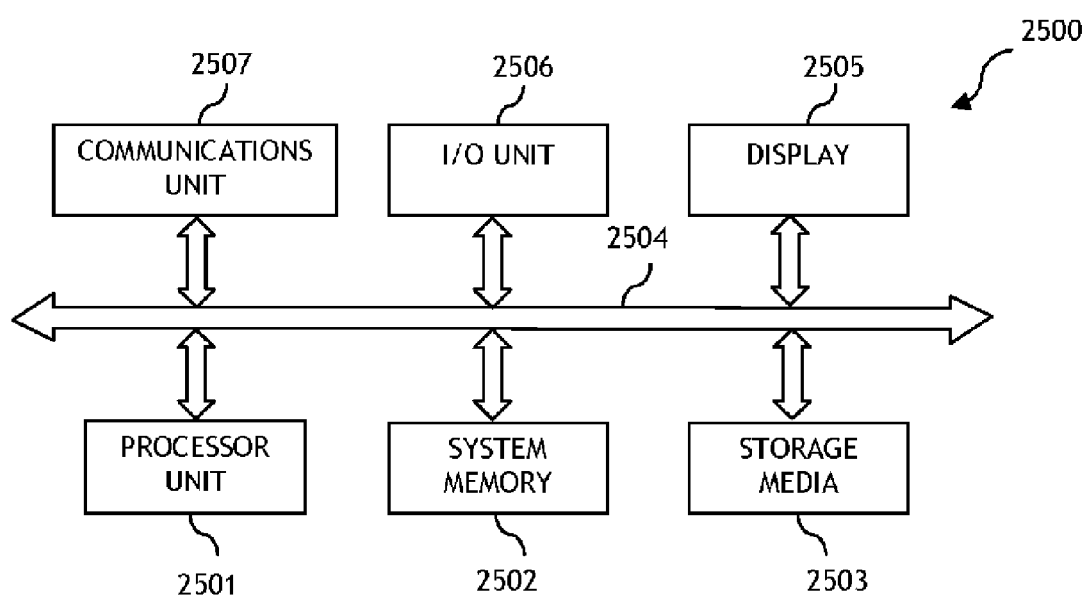
FIG. 25 is a block diagram illustrating one example of a suitable computing environment or operating environment on which the disclosed method may be implemented.

The following description FIG. 25 is intended to provide an overview of computer hardware and other operating components suitable for implementing the invention but is not intended to limit the applicable environments. The computing system environment described below is only one example of a suitable computing environment and is not intended to suggest any limitation as to the scope of use or functionality of the invention. Neither should the computing system environment be interpreted as having any dependency or requirement relating to any one nor a combination of components illustrated in the exemplary operating environment. The computing environment includes a general-purpose computing device in the form of a Data Processing System 2500, which may be any of computing devices. While the present invention is described hereinafter with particular reference to the system block diagram of FIG. 25 it is to be understood at the outset of the description which follows, it is contemplated that the apparatus and methods in accordance with the present invention may be used with other hardware configurations as well. For example, the system processor could be an Intel Pentium IV at the Server side and Pentium III at the Client's side.

The exemplary CRM application is operational with numerous other general purpose or special purpose computing system environments or configurations. Examples of well known computing systems, environments, and/or configurations that may be suitable for implementation or use include, but are not limited to personal computer, desktop or a server computer, laptops which run on any one of the following operating system Windows Server 2003, Windows XP, Windows Vista. For accessing the CRM application over the web, browsers like Internet Explorer, Firefox etc are supported.

Turning now to FIG. 25, a diagram of a design system is depicted in accordance with an illustrative embodiment. In this illustrative example, Data Processing System 2500 includes Communications Fabric 2504, provides communications between Processor Unit 2501, System Memory 2502, Storage Media 2503, Communications Unit 2507, I/O unit 2506, and display 2505.

Processor Unit 2501 serves to execute instructions for software that may be loaded into System Memory 2502. Processor unit 2501 may be a set of one or more processors or may be a multi-processor core, depending on the particular implementation. The Processing Unit 2501 sends various data values, instructions, and information to all the devices and components inside Data Processing System 2500 as well as the different peripherals and devices attached.

The System Memory 2502 is the place where the computer holds current programs and data that are in use. The System Memory 2502 can be divided into two essential types: RAM and ROM. RAM, or Random Access Memory is 'volatile' which means that it only holds data while power is present. RAM changes constantly as the system operate, providing the storage for all data required by the operating system and software. ROM or Read Only Memory is always found on motherboards, but is increasingly found on graphics cards and some other expansion cards and peripherals. Instructions for the operating system, the object-oriented programming system, and applications or programs are located on Storage Media 2503. These instructions may be loaded into System Memory 2502 for execution by Processor Unit 2501. The processes of the different embodiments may be performed by Processor Unit 2501 using computer implemented instructions, which may be located in the System Memory 2502.

Similarly in network environment, program modules depicted relative to Data Processing System 2500, or portions thereof, may be stored in a Remote Memory Storage Devices. Various modules and techniques may be described herein in the general context of computer-executable instructions, such as program modules, executed by one or more computers or other devices. An implementation of these modules and techniques may be stored on or transmitted across some form of computer readable media. Storage Media 2503 may include removable/non-removable, volatile/non-volatile computer storage media depending upon the particular implementation. For example, Storage Media 2503 may be, a hard drive for reading from and writing to a non-removable, non-volatile magnetic media (not shown), magnetic disk drive for reading from and writing to removable, non-volatile magnetic disk (e.g. floppy disk) and optical disk drive for reading from and/or writing to a removable, non-volatile optical disk drive such as CD-ROM, DVD-ROM, a flash memory, or some combination of the above. The hard disk drive, magnetic disk drive and optical disk drive are each connected to the system bus through one or more data media interface.

Communications Unit 2507, in these examples, provides for communications with other data processing systems or devices. In these examples, Communications Unit 2507 is a network interface card. I/O Unit 2506 allows for input and output of data with other devices that may be connected to Data Processing System 2500. For example, I/O Unit 2506 may provide a connection for user input though a keyboard and mouse. Further, I/O Unit 2506 may send output to a printer. Display 2505 provides a mechanism to display information to a user. Data Processing System 2500 can be connected to other remote computing devices via network connections constituting a computer network. Remote computing device for example can be a desktop or a server computer, laptops. Remote computing device may include many or all of the elements and features described herein relative to Data Processing System 2500. Alternatively, Data Processing System 2500 can operate in a non-networked environment as well. Networks connections between the Data Processing System 2500 and remote computers may be a local area network (LAN) and a wide area network (WAN). A LAN covers a small geographic area, like a home, office, or building whereas a WAN covers a relatively broad geographic area (i.e. one city to another and one country to another country). In a LAN environment, Data Processing System 2500 is connected to local network of computers via network adapter. When implemented in a WAN network environment, Data Processing System 2500 includes modem or other means for establishing communications over network. Modem can be internal or external to computer; can be connected to system bus via I/O Unit 2506 or other appropriate mechanisms. In some illustrative examples, the Data Processing System 2500 may be a Personal Digital Assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main System Memory 2502 or cache memory. A Processing Unit may include one or more processors or CPUs. The depicted examples in FIG. 25 and above-described examples are not meant to imply architectural limitations. For example, Data Processing System 2500 also may be a tablet computer, laptop computer, or telephone device in addition to taking the form of a PDA. In operation, Data Processing System 2500 executes computer executable instructions such as those illustrated in FIG. 21, FIG. 22, FIG. 23 and FIG. 24. The order of execution or performance of the methods illustrated and described herein is not essential, unless otherwise specified. That is, elements of the methods may be performed in any order and that the methods may include more or less elements than those disclosed herein. FIG. 25 is intended as an example, and not as an architectural limitation for different embodiments. The hardware in FIG. 25 may vary depending on the implementation. In addition, the processes of the illustrative embodiments may be applied to a multiprocessor data processing system.

INDUSTRIAL APPLICABILITY

The invention makes use of the existing database records and creates a link between the contacts that are related to the main contact records in the database. There is no need to track separate communications between the institution/organization and the contacts (i.e. separate communications for the Base Objects and the Related Objects). Moreover, since there is no need to create a separate campaign for each of the Related Objects, the cost per campaign reduces significantly which in turn produces a better Return on Investment (ROI) for each Campaign. The invention also makes a great value add to an institution/organization as they can increase the conversion ratio of their Campaign since various Related Objects, who are usually the influencers or decision makers, could be involved at various levels in the Campaign process. The invention is the Unique Selling Proposition (USP) of the Campaign module in CRM application. It helps in marketing and selling the product globally as it is a generic solution applicable to different verticals and geographical markets.

The description of the illustrative embodiments have been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Those who are skilled in this art will recognize that the system disclosed herein is comprised of a variety of physical components and these components can be programmed to operate according to event driven algorithms. It is to be understood, however, that the invention is not limited to the specific features shown or described, and that the means and construction shown or described comprise only the preferred forms of putting the invention into effect. Additionally, while this invention is described in terms of being used for sending SMS messages and text messages between wireless communication networks, it will be readily apparent to those skilled in the art that the invention can be adapted to other uses as well. Therefore, the invention should not be construed as being solely limited to use in SMS messaging, and is therefore, claimed in any of its forms or modifications within the legitimate and valid scope of the appended claims.

The invention claimed is:

1. A method to send a Short Message Service (SMS) messages to a Related Object by selecting a Base Object in a Customer Relationship Management System (CRM) application, the method comprising the steps of:
    (a) creating a campaign workflow in memory of a computer with an action to send an SMS message to the Related Object;
    (b) selecting a mobile property of the Related Object from a user interface of the CRM application while building the action;
    (c) building code containing information about the mobile property of the Related Object in a pre-defined format;
    (d) saving the campaign workflow in an application database coupled to the computer wherein the application database is a centralized customer repository configured to store data related to Base Objects and Related Objects; and,
    (e) updating a table of the application database containing outbound SMS messages,
    wherein building the code further comprises storing the code in a pre-defined format wherein said predefined format further comprises:
    a Mobile Property ID that points to a Mobile Property Identifier of the Related Object;
    a Base Object ID that points to a unique table identifier of a Base Object table;
    a Related Object ID that points to the unique table identifier and the Related Object table;
    a Related Object Mapped Property ID that points to the Mobile Property ID of the Related Object that is mapped to the Base Object table; and,
    a full name of the property that indicates an attribute name of the mobile property of the Related Object.

2. The method as in claim 1, further comprising the steps of:
    (a) running the campaign with the targets of the campaign wherein the targets are the Base Objects in the campaign workflow;
    (b) parsing the set of code and extracting Mobile Property ID, Base Object ID, Related Object ID, Related Object Mapped Property ID and the name of the property from the string;
    (c) based on Related Object Mapped Property ID, searching for the mobile property of the Related Object from the records of the Related Object table;
    (d) forming a query to fetch mobile property values of Related Object from the records of the database table;
    (e) updating staging table with fetched mobile property values;
    (f) placing respective SMS message to the outbound message queue, against fetched mobile number in the staging table; and
    (g) transmitting SMS message to the respective SMS Service Provider whereby the SMS service provider further transmits the SMS message to the mobile device of the Related Object.

3. The method as in claim 2, wherein said staging table further comprises:
    (a) mobile number of the Related objects;
    (b) subject line of the outbound SMS message; and
    (c) content of the SMS message to be transmitted.

4. The method as in claim 2, wherein said service provider is configured to the CRM application to receive and deliver SMS messages to the customers.

5. The method as in claim 1, wherein:
    (a) the Base Object is a data record contained in Base Object table, wherein each data record comprises attribute values for one or more attributes of the Base Object, with a unique record identifier;
    (b) said Base Object table is stored in the customer repository;
    (c) the Related Object is a data record contained in the Related Object table, wherein each data record comprises attribute values for one or more attributes of the Related Object, with a unique record identifier;
    (d) said Related Object table is stored in the customer repository; and
    (e) said Base Object table and said Related Object table are linked to each other through the unique record identifier, the record identifier being constant between the both, the Base Object table and the Related Object table.

6. The method as in claim 5, wherein:
    (a) the Base Object table has a unique table identifier; and
    (b) the Related Object table has a unique table identifier.

7. The method as in claim 1, wherein the relationship selected while deploying the CRM application on the computing device is at least one of:
    (a) one-to-one relationship whereby each Base Object has only one Related Object;
    (b) one-to-many relationship whereby each Base Object has at least two Related Objects;
    (c) many-to-one relationship whereby at least two Base objects have at least one common Related Object; and
    (d) many-to-many relationship whereby at least two Base Objects have at least two Related Objects and each Base Object has at least one common Related Object.

8. A computer readable storage memory having recorded thereon statements and instructions for execution by a computer to carry out a method to send Short Message Service (SMS) messages to a Related Object by selecting a Base Object in a Customer Relationship Management System (CRM) application, the method comprising the steps of:
    (a) creating a campaign workflow in memory of a computer with an action to send an SMS message to the Related Object;
    (b) selecting a mobile property of the Related Object from a user interface of the CRM application while building the action;

(c) building code containing information about the mobile property of the Related Object in a pre-defined format;
(d) saving the campaign workflow in an application database coupled to the computer wherein the application database is a centralized customer repository configured to store data related to Base Objects and Related Objects; and,
(e) updating a table of the application database containing outbound SMS messages,
wherein building the code further comprises storing the code in a pre-defined format wherein said predefined format further comprises:
a Mobile Property ID that points to a Mobile Property Identifier of the Related Object;
a Base Object ID that points to a unique table identifier of a Base Object table;
a Related Object ID that points to the unique table identifier and the Related Object table;
a Related Object Mapped Property ID that points to the Mobile Property ID of the Related Object that is mapped to the Base Object table; and,
a full name of the property that indicates an attribute name of the mobile property of the Related Object.

9. A method to send a Short Message Service (SMS) message to both Base Object of a customer relationship management (CRM) application and a Related Object of the CRM application, by selecting the Base Object, the method comprising the steps of:
(a) creating campaign workflow with Action to send SMS the Base Object and Action to send SMS to the Related Object;
(b) selecting mobile property of the Base Object from the CRM application User Interface, while building the Action to send SMS to Base Object;
(c) selecting mobile property of the Related Object from the CRM application User Interface, while building the Action to send SMS to Related Object;
(d) building first set of code containing information about the mobile property of the Base Object in first pre-defined format;
(e) building second set of code containing information about the mobile property of the Related Object in second pre-defined format;
(f) saving the campaign workflow in the application database wherein the application database is a centralized customer repository configured to store data related to Base Objects and Related Objects;
(g) updating the database table containing outbound SMS messages;
wherein building the code further comprises storing the code in a pre-defined format wherein said predefined format further comprises:
a Mobile Property ID that points to a Mobile Property Identifier of the Related Object;
a Base Object ID that points to a unique table identifier of a Base Object table;
a Related Object ID that points to the unique table identifier and the Related Object table;
a Related Object Mapped Property ID that points to the Mobile Property ID of the Related Object that is mapped to the Base Object table; and,
a full name of the property that indicates an attribute name of the mobile property of the Related Object.

10. The method as in claim 9 further comprising the steps of:
(a) running the campaign with the targets of the campaign wherein the targets are the Base Objects in the campaign workflow;
(b) parsing first set of code into first string and extracting mobile property ID, Base Object ID, and name of the property from the first string;
(c) parsing second set of code into second string and extracting mobile property ID, Base Object ID, Related Object ID, the Related Object Mapped Property ID and name of the property from the second string;
(d) searching for the mobile property of the Base Object from the records of the Base Object table;
(e) based on Related Object Mapped Property ID, searching for the mobile property of the Related Object from the records of the Related Object table;
(f) forming a query to fetch mobile property values of Base Object and Related Object from the records of the database table;
(g) updating staging table with fetched mobile property values;
(h) placing respective SMS message to the outbound message queue, against fetched mobile number in the staging table; and
(i) transmitting SMS message to the respective SMS Service Provider whereby the SMS service provider further transmits the SMS message to the mobile devices of the Base Object and the Related Object.

11. The method as in claim 10, wherein the staging table further comprises:
(a) mobile number of target Base Objects and Related Objects;
(b) subject line of the outbound SMS message; and
(c) content of the SMS message.

12. The method as in claim 9, wherein:
(a) the Base Object is a data record contained in Base Object table, wherein each data record comprises attribute values for one or more attributes of the Base Object, with a unique record identifier;
(b) said Base Object table is stored in the customer repository;
(c) the Related Object is a data record contained in Related Object table, wherein each data record comprises attribute values for one or more attributes of the Related Object, with a unique record identifier;
(d) said Related Object table is stored in the customer repository; and
(e) the Base Object and the Related Object are linked to each other through the unique record identifier, the record identifier being constant between the both, the Base Object table and the Related Object table.

13. The method as in claim 12, wherein:
(a) the Base Object table has a unique table identifier; and
(b) the Related Object table has a unique table identifier.

14. The method as in claim 9, wherein the relationship selected while deploying the CRM application on the computing device is at least one of:
(a) one-to-one relationship whereby one Base Object has only one Related Object;
(b) one-to-many relationship whereby one Base Object has at least two Related Objects;
(c) many-to-one relationship whereby at least two Base objects have at least one common Related Object; and many-to-many relationship whereby at least two Base Objects have at least two Related Objects and each Base Object has at least one common Related Object.

15. The method as in claim 9, wherein the step of building second set of code further comprises storing set of code in a pre-defined format wherein said pre-defined format further comprises:
  (a) mobile property ID that points to the mobile property identifier of the Related Object;
  (b) base Object ID that points to the unique table identifier of the Base Object table;
  (c) related Object ID that points to the unique table identifier the Related Object table;
  (d) related Object Mapped Property ID that points to the mobile property ID of the Related Object which is mapped to the Base Object table; and full name of the property that indicates the attribute name of the mobile property of the Related Object.

16. A computer readable storage memory having recorded thereon statements and instructions for execution by a computer to carry out a method to send a Short Message Service (SMS) message to both a Base Object of a customer relationship management (CRM) application and a Related Object of the CRM application, by selecting the Base Object, the method comprising the steps of:
  (a) creating campaign workflow with Action to send SMS the Base Object and Action to send SMS to the Related Object;
  (b) selecting mobile property of the Base Object from the CRM application User Interface, while building the Action to send SMS to Base Object;
  (c) selecting mobile property of the Related Object from the CRM application User Interface, while building the Action to send SMS to Related Object;
  (d) building first set of code containing information about the mobile property of the Base Object in first pre-defined format;
  (e) building second set of code containing information about the mobile property of the Related Object in second pre-defined format;
  (f) saving the campaign workflow in the application database wherein the application database is a centralized customer repository configured to store data related to Base Objects and Related Objects;
  (g) updating the database table containing outbound SMS messages;
  wherein building the code further comprises storing the code in a pre-defined format wherein said predefined format further comprises:
  a Mobile Property ID that points to a Mobile Property Identifier of the Related Object;
  a Base Object ID that points to a unique table identifier of a Base Object table;
  a Related Object ID that points to the unique table identifier and the Related Object table;
  a Related Object Mapped Property ID that points to the Mobile Property ID of the Related Object that is mapped to the Base Object table; and,
  a full name of the property that indicates an attribute name of the mobile property of the Related Object.

* * * * *